United States Patent
Suzuki et al.

(10) Patent No.: US 8,038,489 B2
(45) Date of Patent: Oct. 18, 2011

(54) BOAT PROPULSION SYSTEM, AND CONTROL DEVICE AND CONTROL METHOD FOR THE SAME

(75) Inventors: Takayoshi Suzuki, Shizuoka (JP); Hideaki Matsushita, Shizuoka (JP); Daisuke Nakamura, Shizuoka (JP); Tsugunori Konakawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 269 days.

(21) Appl. No.: 12/427,810

(22) Filed: Apr. 22, 2009

(65) Prior Publication Data
US 2009/0269997 A1   Oct. 29, 2009

(30) Foreign Application Priority Data
Apr. 23, 2008   (JP) ................. 2008-112034

(51) Int. Cl.
*B63H 21/21* (2006.01)
(52) U.S. Cl. ............................. 440/1; 440/86
(58) Field of Classification Search ............... 440/1, 84, 440/86
See application file for complete search history.

(56) References Cited

U.S. PATENT DOCUMENTS
5,255,570 A * 10/1993 Shirahama et al. ........ 74/473.23
6,832,940 B2 * 12/2004 Itoi ................................ 440/86
2006/0213301 A1   9/2006 Mizuguchi et al.

FOREIGN PATENT DOCUMENTS
JP   2006-264361 A   10/2006
* cited by examiner

*Primary Examiner* — Stephen Avila
(74) *Attorney, Agent, or Firm* — Keating & Bennett, LLP

(57) ABSTRACT

An outboard motor includes a prime mover, a marine propulsion unit having a propeller arranged to be driven by a rotational force of the prime mover to generate a thrust force, a shift position changing mechanism, a shift position changing mechanism actuator, and a control unit arranged to control the shift position changing mechanism actuator. When the shift position is changed to one of the first shift position and the second shift position from the neutral position, the control unit inhibits a change in the shift position to the other one of the first shift position and the second shift position until a predetermined time period elapses. The above arrangement improves the controllability of a boat propulsion system having an electronically controlled shift mechanism.

9 Claims, 25 Drawing Sheets

| Component name (reference numeral) | Low speed forward | High speed forward | Neutral | Low speed reverse | High speed reverse |
|---|---|---|---|---|---|
| Transmission ratio changing hydraulic clutch (53) | × | ○ | ×(○) | × | ○ |
| First shift position changing hydraulic clutch (61) | × | × | × | ○ | ○ |
| Second shift position changing hydraulic clutch (62) | ○ | ○ | × | × | × |
| One-way clutch (58) | Prevent rotation in reverse direction | Allow rotation in right direction | Not work | Prevent rotation in reverse direction | Allow rotation in right direction |
| Shift position | Low speed forward | High speed forward | Neutral | Low speed reverse | High speed reverse |

○ : Clutch connected state   × : Clutch disconnected state

FIG. 6

BOAT PROPULSION SYSTEM, AND CONTROL DEVICE AND CONTROL METHOD FOR THE SAME

BACKGROUND OF THE INVENTION

1. Field of the Invention

The present invention relates to a boat propulsion system, and a control device and control method for the same. More particularly, the present invention relates to a boat propulsion system having an electronically controlled shift mechanism, and a control device and a control method for the same.

2. Description of the Related Art

Conventionally, as described, for example, in JP-A 2006-264361, a technology for changing shift positions by actuating a shift mechanism of an outboard motor using an electrically operable actuator has been disclosed. In the shift mechanism of JP-A 2006-264361, the electrically operable actuator actuates a dog clutch between a connected state and a disconnected state to change the shift position among forward, reverse, and neutral positions.

Boat shift change operations of a control lever are, typically, conducted for accelerating, decelerating, or stopping the boat. Hence, in a boat, the shift position change operations are relatively frequently conducted. Occasionally, the shift position change operations can be conducted without any pauses.

However, in the electronically controlled shift mechanism of JP-A 2006-264361, a time lag exists after a boat operator has operated a control lever and before a shift position change is actually completed. Thus, if such a shift position change operation is conducted without a pause, an actual shift position change can fail to follow the shift position change operation. If the actual shift position change does not follow the shift position change operation, the operator can feel some discomfort in handling the boat.

SUMMARY OF THE INVENTION

In order to overcome the problems described above, preferred embodiments of the present invention improve the controllability of a boat propulsion system that has an electronically controlled shift mechanism.

A boat propulsion system according to a preferred embodiment of the present invention preferably includes a prime mover, a marine propulsion unit, a shift position changing mechanism, a shift position changing mechanism actuator, and a control unit. The prime mover is arranged to generate a rotational force. The propulsion unit preferably has a propeller driven by the rotational force of the prime mover. The propulsion unit is arranged to generate a thrust force. The shift position changing mechanism is preferably located between the prime mover and the propulsion unit. The shift position changing mechanism is arranged to selectively change the shift position between a first shift position, a second shift position at which a rotational direction of the rotational force of the prime mover is reversed and the reversed rotational force is transmitted to the propulsion unit, and a neutral position. The shift position changing mechanism actuator actuates the shift position changing mechanism. The control unit controls the shift position changing mechanism actuator. Once the shift position is changed to one of the first shift position and the second shift position from the neutral position, the control unit inhibits a change in the shift position to the other one of the first shift position and the second shift position until a predetermined period of time elapses.

A control device for a boat propulsion system according to another preferred embodiment of the present invention includes a control device for a boat propulsion system preferably having a prime mover, a marine propulsion unit, a shift position changing mechanism, and a shift position changing mechanism actuator. The prime mover is arranged to generate a rotational force. The propulsion unit preferably has a propeller driven by the rotational force of the prime mover. The propulsion unit generates a thrust force. The shift position changing mechanism is preferably located between the prime mover and the propulsion unit. The shift position changing mechanism is arranged to selectively change the shift position between a first shift position, a second shift position at which a rotational direction of the rotational force of the prime mover is reversed and the reversed rotational force is transmitted to the propulsion unit, and a neutral position. The shift position changing mechanism actuator is arranged to actuate the shift position changing mechanism.

In the control device provided for such a boat propulsion system according to the above preferred embodiment, once the shift position is changed to one of the first shift position and the second shift position from the neutral position, changing the shift position to the other one of the first shift position and the second shift position is inhibited until a predetermined period of time elapses.

A control method for a boat propulsion system according to a further preferred embodiment of the present invention includes a boat propulsion system preferably having a prime mover, a marine propulsion unit, a shift position changing mechanism, and a shift position changing mechanism actuator. The prime mover is arranged to generate a rotational force. The propulsion unit preferably has a propeller driven by the rotational force of the prime mover. The propulsion unit generates a thrust force. The shift position changing mechanism is preferably located between the prime mover and the propulsion unit. The shift position changing mechanism is arranged to selectively change the shift position among a first shift position, a second shift position at which a rotational direction of the rotational force of the prime mover is reversed and the reversed rotational force is transmitted to the propulsion unit, and a neutral position. The shift position changing mechanism actuator is arranged to actuate the shift position changing mechanism.

The above control method provided for such a boat propulsion system includes a step of inhibiting a change in the shift position, once the shift position is changed to one of the first shift position and the second shift position from the neutral position, to the other one of the first shift position and the second shift position until a predetermined period of time elapses.

According to various preferred embodiments of the present invention, the controllability of a boat propulsion system that has an electronically controlled shift mechanism can be improved.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 6 is a table showing connected and disconnected states of first, second, and third hydraulic clutches, and shift positions of the shift mechanism.

DETAILED DESCRIPTION OF THE PREFERRED EMBODIMENTS

With reference to an outboard motor 20 shown in FIG. 1, preferred embodiments of the present invention will be described below. It should be noted that the preferred embodiments discussed below are only examples of preferred embodiments of the present invention. The present invention is not limited to the exemplary preferred embodiments. The boat propulsion system according to the present invention may be alternatively a so-called inboard motor or a so-called stern drive, for example. The stern drive is also referred to as an inboard-outboard. The "stern drive" is a boat propulsion system in which at least a prime over is installed on a hull. The "stern drive" also includes a system in which components other than a propulsion unit are installed on a hull.

First Preferred Embodiment

Figure 1:
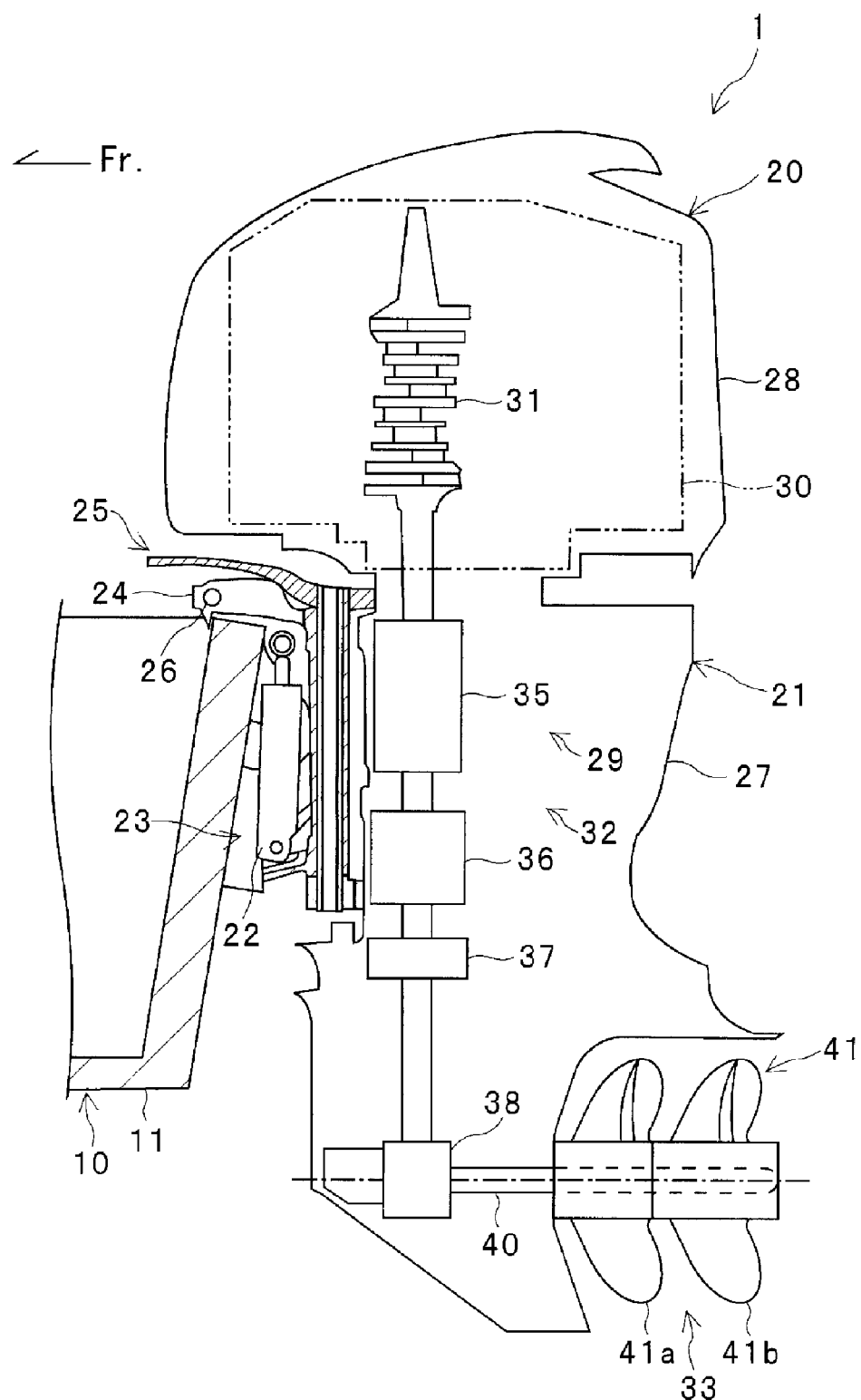
FIG. 1 is a partial cross-sectional view of a boat configured in accordance with a first preferred embodiment of the present invention, showing a stern thereof as viewed from a side of the boat.

FIG. 1 is a partial cross-sectional view of a boat 1 configured in accordance with a first preferred embodiment, showing a stern 11 thereof in a cross-section viewed from a lateral side of the boat 1. As shown in FIG. 1, the boat 1 includes a hull 10, and an outboard motor 20 which works as a boat propulsion system. The outboard motor 20 is mounted to the stern 11 of the hull 10.

Overall Construction of Outboard Motor

The outboard motor 20 preferably has an outboard drive 21, a tilt and trim mechanism 22, and a bracket 23.

The bracket 23 includes a mounting bracket 24 and a swivel bracket 25. The mounting bracket 24 is fixed to the hull 10 by screws, for example, which are not shown.

The mounting bracket 24 preferably supports the swivel bracket 25 through a pivot shaft 26. The swivel bracket 25 is vertically pivotable about a center axis of the pivot shaft 26. The outboard drive 21 is mounted to the swivel bracket 25 through so-called rubber mounts, for example.

The tilt and trim mechanism 22 is provided to tilt and trim the outboard drive 21 relative to the bracket 25.

The outboard drive 21 preferably has a casing 27, a cowling 28, and a thrust force generating device 29. The major portion of the thrust force generating device 29 is disposed inside the casing 27 and the cowling 28.

Figure 2:
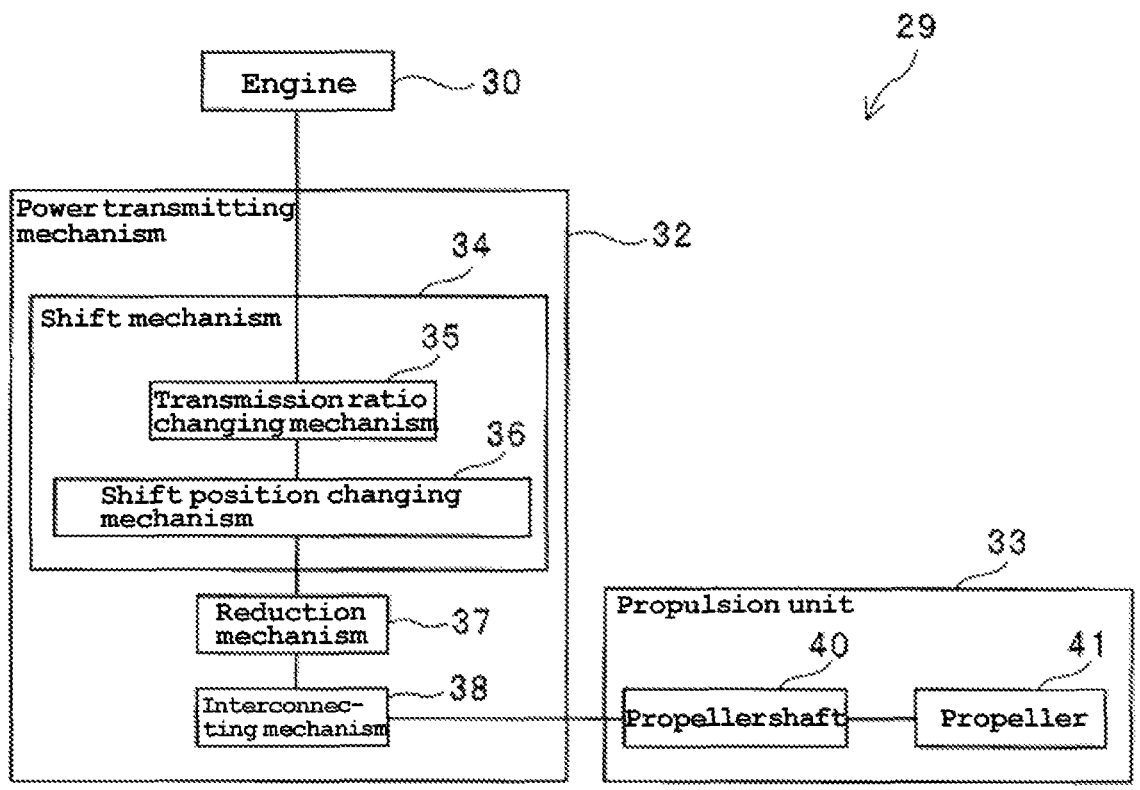
FIG. 2 is a schematic structural diagram showing a structure of a thrust force generating device in the first preferred embodiment of the present invention.

As shown in FIGS. 1 and 2, the thrust force generating device 29 preferably includes an engine 30, a power transmitting mechanism 32, and a propulsion unit 33.

Additionally, in this preferred embodiment, the engine 30 of the outboard motor 20 is arranged to work as a prime mover. The prime mover, however, is not limited to a particular device insofar as the particular device can generate a rotational force. For example, the prime mover can be an electric motor, for example.

Figure 5:
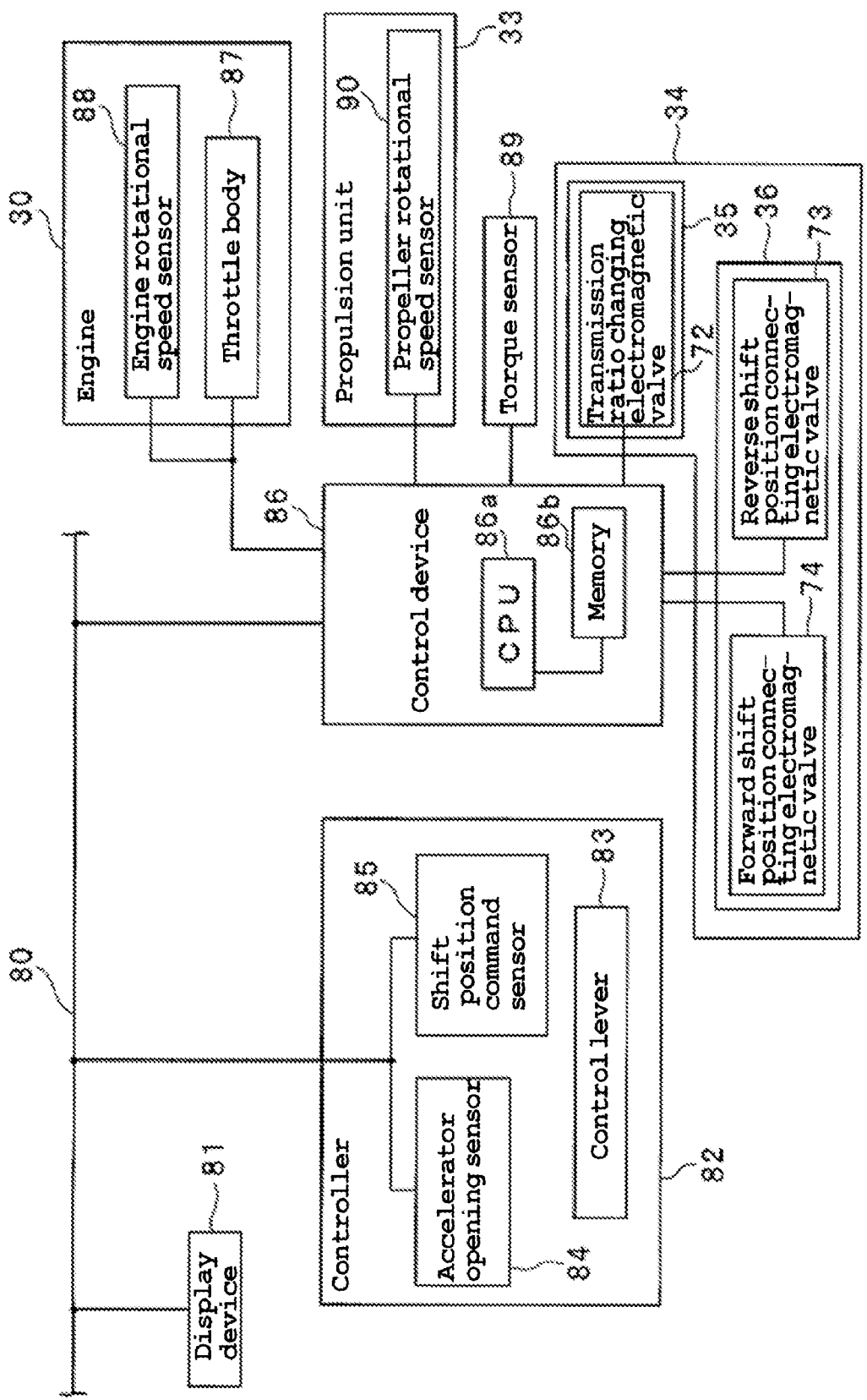
FIG. 5 is a control block diagram for the boat.

The engine 30 is preferably a fuel injection type engine having a throttle body 87 shown in FIG. 5. The engine 30 generates a rotational force. As shown in FIG. 1, the engine 30 has a crankshaft 31. The engine 30 outputs the generated rotational force through the crankshaft 31.

The power transmitting mechanism 32 is preferably positioned between the engine 30 and the propulsion unit 33. The power transmitting mechanism 32 is arranged to transmit the rotational force generated by the engine 30 to the propulsion unit 33. The power transmitting mechanism 32 preferably includes a shift mechanism 34, a reduction mechanism 37, and an interconnecting mechanism 38.

The shift mechanism 34 is connected to the crankshaft 31 of the engine 30. As shown in FIG. 2, the shift mechanism 34 preferably includes a transmission ratio changing mechanism 35 and a shift position changing mechanism 36.

The transmission ratio changing mechanism 35 selectively changes a transmission ratio provided between the engine 30 and the propulsion unit 33 between a high speed transmission ratio (HIGH) and a low speed transmission ratio (LOW). The term "high speed transmission ratio" means a transmission ratio such that a ratio of an output side rotational speed to an input side rotational speed is relatively large. Meanwhile, the term "low speed transmission ratio" means a transmission ratio such that the ratio of the output side rotational speed to the input side rotational speed is relatively small.

The shift position changing mechanism 36 is arranged to selectively change the shift position among a forward position, a reverse position, and a neutral position.

The reduction mechanism 37 is preferably connected to the shift mechanism 34. The reduction mechanism 37 transmits the rotational force provided from the shift mechanism 34 downstream to the propulsion unit 33 by reducing a rotational speed. The reduction mechanism 37 can employ any desirable construction. For example, the reduction mechanism 37 can include a planetary gear mechanism. Alternatively, the reduction mechanism 37 can include a reduction gear couple.

The interconnecting mechanism 38 is preferably positioned between the reduction mechanism 37 and the propulsion unit 33. The interconnecting mechanism 38 preferably includes a bevel gear assembly which is not shown. The interconnecting mechanism 38 transmits the rotational force provided from the reduction mechanism 37 to the propulsion unit 33 by changing directions.

The propulsion unit 33 preferably has a propeller shaft 40 and a propeller 41. The propeller shaft 40 transmits the rotational force provided from the interconnecting mechanism 38 to the propeller 41. The propulsion unit 33 converts the rotational force generated by the engine 30 to a thrust force.

As shown in FIG. 1, the propeller 41 preferably includes two propeller elements, i.e., a first propeller 41a and a second propeller 41b. The spiral direction of the first propeller 41a and the spiral direction of the second propeller 41b are preferably opposite to each other. If the rotational force is given in a right direction when outputted from the power transmitting mechanism 32, the first propeller 41a and the second propeller 41b rotate oppositely relative to each other to generate the thrust force in a forward direction. The shift position in this state is the forward position. Meanwhile, if the rotational force is given in a reverse direction when outputted from the power transmitting mechanism 32, the first propeller 41a and the second propeller 41b rotate oppositely relative to each other and reversely relative to the forward propulsion state to generate the thrust force in a reverse direction. The shift position in this state is the reverse position.

Structure of Shift Mechanism

Figure 3:
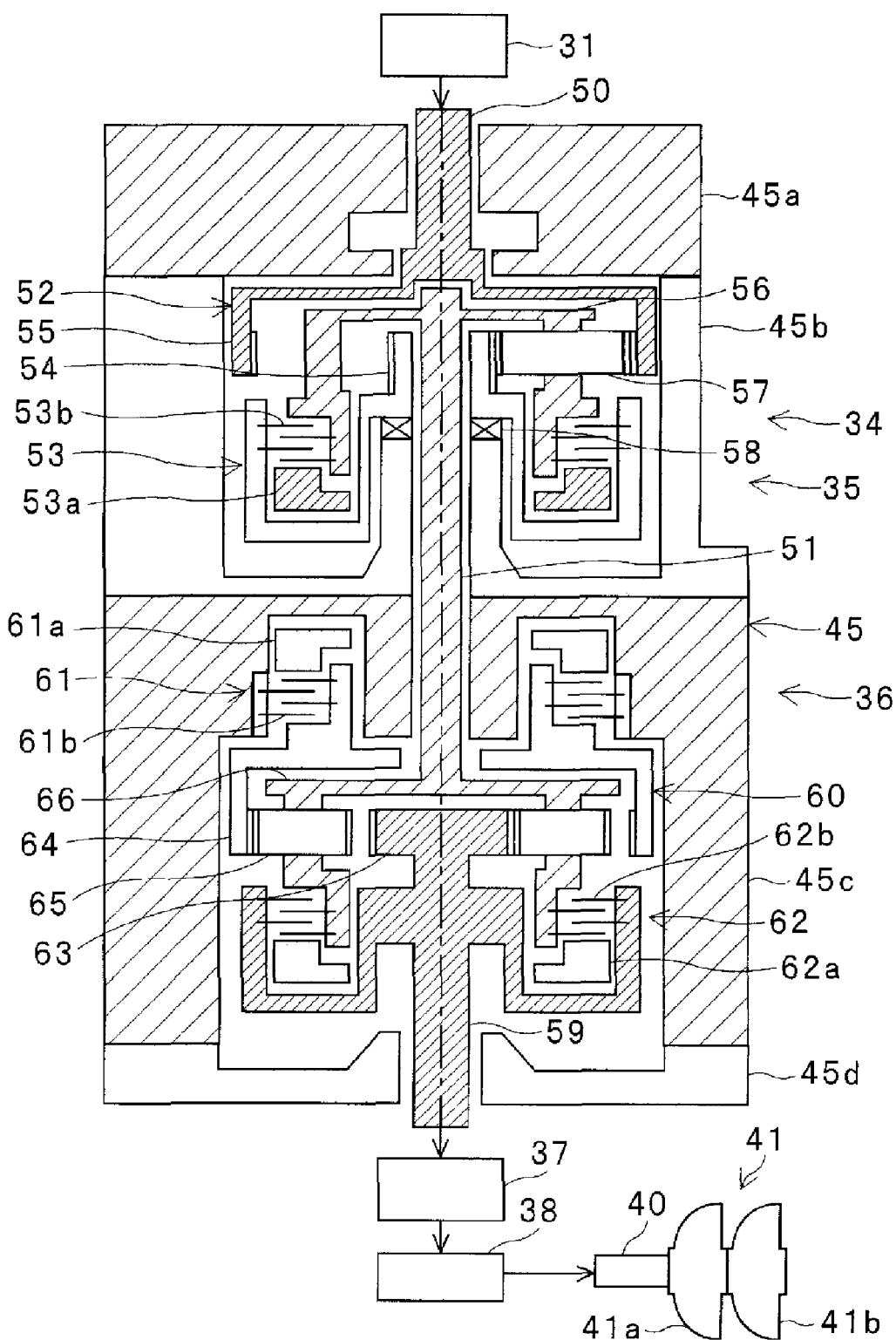
FIG. 3 is a schematic cross-sectional view showing a shift mechanism in the first preferred embodiment of the present invention.

Next, mainly with reference to FIG. 3, a structure of the shift mechanism 34 in this preferred embodiment will be described in detail. It should be noted that the shift mechanism 34 shown in FIG. 3 is merely an exemplary structure, and any other desirable structure could be used. In the present invention, the shift mechanism is not limited to the shift mechanism 34 shown in FIG. 3. Additionally, FIG. 3 shows the shift mechanism 34 schematically. Therefore, the structure of the shift mechanism 34 shown in FIG. 3 is not strictly consistent with an actual structure of the shift mechanism 34.

The shift mechanism 34 preferably has a shift housing 45. The shift housing 45 is generally cylindrically shaped in appearance. The shift housing 45 includes a first housing 45a, a second housing 45b, a third housing 45c, and a fourth housing 45d. The first housing 45a, the second housing 45b, the third housing 45c, and the fourth housing 45d are preferably coupled with each other by bolts or the like, for example.

Transmission Ratio Changing Mechanism

The transmission ratio changing mechanism 35 preferably has a first power transmitting shaft 50 working as an input shaft, a second power transmitting shaft 51 working as an output shaft, a planetary gear mechanism 52, and a transmission ratio changing hydraulic clutch 53. The first power transmitting shaft 50 and the second power transmitting shaft 51 are coaxially or substantially coaxially aligned. The first housing 45a supports the first power transmitting shaft 50 for rotation.

The second housing 45b and the third housing 45c together support the second power transmitting shaft 51 for rotation. The first power transmitting shaft 50 is connected to the crankshaft 31. Also, the first power transmitting shaft 50 is connected to the planetary gear mechanism 52.

The planetary gear mechanism 52 has a sun gear 54, a ring gear 55, a carrier 56, and a plurality of planetary gears 57. The ring gear 55 is generally cylindrically shaped. An inner peripheral surface of the ring gear 55 has teeth engaging with teeth of the planetary gears 57. The ring gear 55 is connected to the first power transmitting shaft 50. The ring gear 55 rotates together with the first power transmitting shaft 50.

The sun gear 54 is disposed within the ring gear 55. The sun gear 54 and the ring gear 55 are coaxially or substantially coaxially aligned to rotate about the same axis. The sun gear 54 is preferably mounted to the second housing 45b through a one-way clutch 58. The one-way clutch 58 allows rotation in a right direction while preventing rotation in the reverse direction. Accordingly, the sun gear 54 can rotate in the right direction while the sun gear 54 cannot rotate in the reverse direction.

The plurality of planetary gears 57 are disposed between the sun gear 54 and the ring gear 55. The respective planetary gears 57 engage both the sun gear 54 and the ring gear 55. The carrier 56 supports the respective planetary gears 57 for rotation. The respective planetary gears 57 thus revolve about an axis of the first power transmitting shaft 50 at the same speed as those of the other planetary gears while rotating individually.

Additionally, in this specification, the term "rotate" or "rotation" means that a member turns about an axis positioned within the member. While, on the other hand, the term "revolve" or "revolution" means that a member moves along a circle around an axis positioned outside the member.

The carrier 56 is connected to the second power transmitting shaft 51. The carrier 56 rotates together with the second power transmitting shaft 51.

The transmission ratio changing hydraulic clutch 53 is preferably positioned between the carrier 56 and the sun gear 54. In this preferred embodiment, the transmission ratio changing hydraulic clutch 53 preferably is a wet type multiple disk clutch. However, in the present invention, the transmission ratio changing hydraulic clutch 53 is not limited to the wet type multiple disk clutch. The transmission ratio changing hydraulic clutch 53 could also be a dry type multiple disk clutch, for example. Alternatively, the transmission ratio changing hydraulic clutch 53 could be a so-called dog clutch, for example.

Additionally, in this specification, the term "multiple disk clutch" means a clutch having first and second members rotatable relative to each other, one or multiple first plates rotating together with the first member, and one or multiple second plates rotating together with the second member, and the first and second members being prevented from rotating relative to each other by the first and second plates pressingly contacted with each other. In this specification, the term "clutch" is not limited to a clutch placed between an input shaft to which a rotational force is inputted and an output shaft from which the rotational force is outputted to connect or disconnect the input shaft and the output shaft.

The transmission ratio changing hydraulic clutch 53 preferably has a hydraulic piston 53a and a plate group 53b which includes clutch plates and friction plates. The plate group 53b is brought into a pressingly contacted condition when the piston 53a is driven. Under this condition, the transmission ratio changing hydraulic clutch 53 is in the connected state. Meanwhile, the plate group 53b is not brought into the pressingly contacted condition, i.e., is maintained in a non-contacted condition when the piston 53a is not driven. Under this condition, the transmission ratio changing hydraulic clutch 53 is in the disconnected state.

The sun gear 54 and the carrier 56 are fixedly coupled with each other when the transmission ratio changing hydraulic clutch 53 is in the connected state. Thus, following the revolution of the planetary gears 57, the sun gear 54 and the carrier 56 rotate in unison.

Shift Position Changing Mechanism

The shift position changing mechanism 36 preferably includes the second power transmitting shaft 51, a third power transmitting shaft 59, another planetary gear mechanism 60, a first shift position changing hydraulic clutch 61, and a second shift position changing hydraulic clutch 62. The third housing 45c and the fourth housing 45d together support the third power transmitting shaft 59 for rotation. The second power transmitting shaft 51 and the third power transmitting shaft 59 are coaxially or substantially coaxially aligned. In this preferred embodiment, the hydraulic clutches 61, 62 are preferably wet type multiple disk clutches. Additionally, the second power transmitting shaft 51 is a member included in both the transmission ratio changing mechanism 35 and the shift position changing mechanism 36.

The shift position changing mechanism 36, as described below, is arranged to change the shift position between the forward position as a second shift position, the reverse position as a first shift position, and a neutral position. At the forward position, the first shift position changing hydraulic clutch 61 is in the disconnected state while the second shift position changing hydraulic clutch 62 is in the connected state. At the forward position, the rotational force generated by the engine 30 is outputted from the shift position changing mechanism 36 as the rotational force in the right direction. At the reverse position, the first shift position changing hydraulic clutch 61 is in the connected state while the second shift position changing hydraulic clutch 62 is in the disconnected state. At the reverse position, the rotational force generated by the engine 30 is outputted from the shift position changing mechanism 36 as the rotational force in the reverse direction. At the neutral position, both the first and second shift position changing hydraulic clutches 61, 62 are in the disconnected state. At the neutral position, the rotational force generated by the engine 30 is not outputted from the shift position changing mechanism 36. That is, the rotational force generated by the engine 30 is not transmitted to the propulsion unit 33.

The planetary gear mechanism 60 preferably has a sun gear 63, a ring gear 64, a plurality of planetary gears 65, and a carrier 66.

The carrier 66 is connected to the second power transmitting shaft 51. The carrier 66 rotates together with the second power transmitting shaft 51. Thus, following the rotation of the second power transmitting shaft 51, the carrier 66 rotates and the respective planetary gears 65 revolve at the same speed.

The respective planetary gears 65 engage the ring gear 64 and the sun gear 63. The first shift position changing hydraulic clutch 61 is positioned between the ring gear 64 and the third housing 45c. The first shift position changing hydraulic clutch 61 has a hydraulic piston 61a and a plate group 61b which includes clutch plates and friction plates. The plate group 61b is brought into a pressingly contacted condition when the piston 61a is driven. Under this condition, the first shift position changing hydraulic clutch 61 is in the connected state. As a result, the ring gear 64 is fixedly coupled with the third housing 45c so as not to be rotatable. Meanwhile, the plate group 61b is not brought into the pressingly contacted condition, i.e., is maintained in the non-contacted condition, when the hydraulic piston 61a is not driven. Under this condition, the first shift position changing hydraulic clutch 61 is in the disconnected state. As a result, the ring gear 64 is not fixedly coupled with the third housing 45c so as to be rotatable.

The second shift position changing hydraulic clutch 62 is preferably positioned between the carrier 66 and the sun gear 63. The second shift position changing hydraulic clutch 62 has a hydraulic piston 62a and a plate group 62b which includes clutch plates and friction plates. The plate group 62b is brought into a pressingly contacted condition when the piston 62a is driven. Under this condition, the second shift position changing hydraulic clutch 62 is in the connected state. As a result, the carrier 66 and the sun gear 63 rotate in unison. Meanwhile, the plate group 62b is not brought into the pressingly contacted condition when the hydraulic piston 62a is not driven. Under this condition, the second shift position changing hydraulic clutch 62 is in the disconnected state. As a result, the ring gear 64 and the sun gear 63 are rotatable relative to each other.

Figure 4:
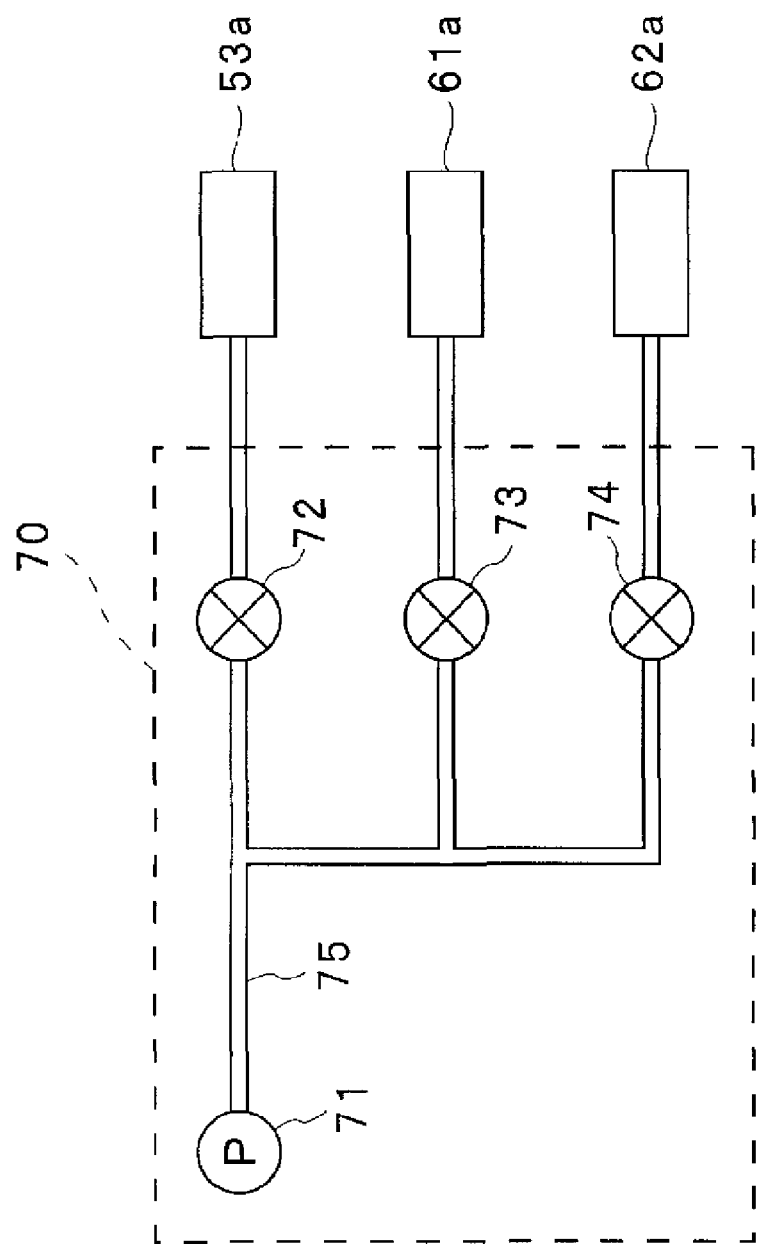
FIG. 4 is a hydraulic circuit diagram in the first preferred embodiment of the present invention.

As shown in FIG. 4, an actuator 70 is arranged to actuate the hydraulic pistons 53a, 61a, 62a. The actuator 70 preferably includes an oil pump 71, a transmission ratio changing electromagnetic valve 72, a reverse shift position connecting electromagnetic valve 73, and a forward shift position connecting electromagnetic valve 74. The oil pump 71 is connected to the hydraulic pistons 53a, 61a, 62a through an oil path 75. The transmission ratio changing electromagnetic valve 72 is positioned between the oil pump 71 and the hydraulic piston 53a. The transmission ratio changing electromagnetic valve 72 adjusts oil pressure of the hydraulic piston 53a. The reverse shift position connecting electromagnetic valve 73 is positioned between the oil pump 71 and the hydraulic piston 61a. The reverse shift position connecting electromagnetic valve 73 adjusts oil pressure of the hydraulic piston 61a. The forward shift position connecting electromagnetic valve 74 is positioned between the oil pump 71 and the hydraulic piston 62a. The forward shift position connecting electromagnetic valve 74 adjusts oil pressure of the hydraulic piston 62a.

Each of the transmission ratio changing electromagnetic valve 72, the reverse shift position connecting electromagnetic valve 73, and the forward shift position connecting electromagnetic valve 74 can gradually change a path area of the oil path 75. Hence, by using the transmission ratio changing electromagnetic valve 72, the reverse shift position connecting electromagnetic valve 73, and the forward shift position connecting electromagnetic valve 74, the pressing force of the hydraulic pistons 53a, 61a, 62a can be gradually changed. Accordingly, the connecting force of the hydraulic clutches 53, 61, 62 can be gradually changed.

More specifically, in this preferred embodiment, each of the transmission ratio changing electromagnetic valve 72, the reverse shift position connecting electromagnetic valve 73, and the forward shift position connecting electromagnetic valve 74 is a solenoid valve controlled in a manner of pulse width modulation (PWM) control. However, each of the transmission ratio changing electromagnetic valve 72, the reverse shift position connecting electromagnetic valve 73, and the forward shift position connecting electromagnetic valve 74 could also be a valve other than the solenoid valve controlled in the manner of pulse width modulation. For example, each of the transmission ratio changing electromagnetic valve 72, the reverse shift position connecting electromagnetic valve 73 and the forward shift position connecting electromagnetic valve 74 can be defined by a solenoid valve controlled in a manner of on-off control, for example.

Additionally, the connecting force of a clutch is a value indicative of a connecting condition of the clutch. That is, for example, the sentence "the connecting force of the transmission ratio changing hydraulic clutch 53 is 100%" means that the hydraulic clutch 53a is actuated so that the plate group 53b is brought into the completely pressingly contacted condition, and the transmission ratio changing hydraulic clutch 53 is in the completely connected state. Meanwhile, for example, the sentence "the connecting force of the transmission ratio changing hydraulic clutch 53 is 0%" means that the hydraulic clutch 53a is not actuated so that the plates of the plate group 53b separate apart from each other to be in the non-contacted condition, and the transmission ratio changing hydraulic clutch 53 is in the completely disconnected state. Also, the sentence "the connecting force of the transmission ratio changing hydraulic clutch 53 is 80%" means that the hydraulic clutch 53a is actuated so that the plate group 53b is brought into the pressingly contacted condition; however, the transmission ratio changing hydraulic clutch 53 is in a half-way connected state. That is, in the half-way connected state, driving torque transmitted to the second power transmitting shaft 51 working as an output shaft from the first power transmitting shaft 50 working as an input shaft is about 80% relative to the torque in the completely connected state of the transmission ratio changing clutch 53, or a rotational speed of the second power transmitting shaft 51 is about 80% relative to the rotational speed of the first power transmitting shaft 50.

Shift Position Change Operations in Shift Mechanism

Next, mainly referring to FIGS. 3 and 6, shift position change operations in the shift mechanism 34 will be described in detail. FIG. 6 is a table showing connected or disconnected states of the hydraulic clutches 53, 61, 62 and shift positions of the shift mechanism 34. In the shift mechanism 34, the shift positions are changed in accordance with the connected or disconnected states of the first, second, and third hydraulic clutches 53, 61, 62.

Changes Between Low Speed Transmission Ratio and High Speed Transmission Ratio

The transmission ratio changing mechanism 35 changes transmission ratios between a low speed transmission ratio and a high speed transmission ratio. More specifically, by operating the transmission ratio changing hydraulic clutch 53, the transmission ratio is changed to the low speed transmission ratio from the high speed transmission ratio and vice versa. In other words, the "low speed transmission ratio" is provided when the transmission ratio changing hydraulic clutch 53 is in the disconnected state. Meanwhile, the "high speed transmission ratio" is provided when the transmission ratio changing hydraulic clutch 53 is in the connected state.

As shown in FIG. 3, the ring gear 55 is connected to the first power transmitting shaft 50. Therefore, following the rotation of the first power transmitting shaft 50, the ring gear 55 rotates in the right direction. Under this condition, if the transmission ratio changing hydraulic clutch 53 is in the disconnected state, the carrier 56 and the sun gear 54 rotate relative to each other. The planetary gears 57 thus rotate and revolve. Consequently, the sun gear 54 is to start rotating in the reverse direction.

As shown in FIG. 6, however, the one-way clutch 58 prevents the sun gear 54 from rotating in the reverse direction. That is, the sun gear 54 is held by the one-way clutch 58. As a result, the second power transmitting shaft 51 rotates together with the carrier 56 because the planetary gears 57 revolve between the sun gear 54 and the ring gear 55 following the rotation of the ring gear 55. Under this condition, because the planetary gears 57 revolve and rotate, the rotation of the first transmitting shaft 50 is transmitted to the second power transmitting shaft 51 with a rotational speed thereof reduced relative to the rotational speed of the first transmitting shaft 50. Accordingly, the transmission ratio under the condition is the "low speed transmission ratio."

On the other hand, if the transmission ratio changing hydraulic clutch 53 is in the connected state, the planetary gears 57 and the sun gear 54 rotate in unison. Hence, individual rotations of the planetary gears 57 are prevented. Accordingly, following the rotation of the ring gear 55, the planetary gears 57, the carrier 56 and the sun gear 54 together rotate in the right direction at the same rotational speed. Under this condition, as shown in FIG. 6, the one-way clutch 58 allows the sun gear 54 to rotate in the right direction. Consequently, the first power transmitting shaft 50 and the second power transmitting shaft 51 rotate in the right direction at the same rotational speed. In other words, the rotational force of the first power transmitting shaft 50 is transmitted to the second transmitting shaft 51 in the same direction at the same speed. Accordingly, the transmission ratio under the condition is the "high speed transmission ratio."

Changes Among Forward, Reverse, and Neutral Positions

The shift position changing mechanism 36 is arranged to change the shift position among the forward, reverse, and neutral positions. More specifically, operations of the first shift position changing hydraulic clutch 61 and the second shift position changing hydraulic clutch 62 can change the shift position among the forward, reverse, and neutral positions.

If the first shift position changing hydraulic clutch 61 is in the disconnected state and the second shift position changing hydraulic clutch 62 is in the connected state, the shift position changing mechanism 36 is set to the "forward position." Under the condition that the first shift position changing hydraulic clutch 61 is in the disconnected state, the ring gear 64 is rotatable relative to the shift housing 45. Under the condition that the second shift position changing hydraulic clutch 62 is in the connected state, the carrier 66, the sun gear 63, and the third power transmitting shaft 59 rotate in unison. Therefore, if the first shift position changing hydraulic clutch 61 is in the disconnected state and the second shift position changing hydraulic clutch 62 is in the connected state, the second power transmitting shaft 51, the carrier 66, the sun gear 63 and the third power transmitting shaft 59 rotate in unison in the right direction. Accordingly, the shift position changing mechanism 36 is set to the "forward position."

If the first shift position changing hydraulic clutch 61 is in the connected state and the second shift position changing hydraulic clutch 62 is in the disconnected state, the shift position changing mechanism 36 is set to the "reverse position." Under the condition that the first shift position changing hydraulic clutch 61 is in the connected state and the second shift position changing hydraulic clutch 62 is in the disconnected state, the shift housing 45 prevents the ring gear 64 from rotating. Meanwhile, the sun gear 63 is rotatable relative to the carrier 66. Thus, following the rotation of the second power transmitting shaft 51 in the right direction, the planetary gears 65 revolve while rotating. Consequently, the sun gear 63 and the third power transmitting shaft 59 rotate in the reverse direction. Accordingly, the shift position changing mechanism 36 is set to the "reverse position."

If both the first shift position changing hydraulic clutch 61 and the second shift position changing hydraulic clutch 62 are in the disconnected state, the shift position changing mechanism 36 is set to the "neutral position." Under the condition that both the first shift position changing hydraulic clutch 61 and the second shift position changing hydraulic clutch 62 are in the disconnected states, the planetary gear mechanism 60 is in an idling state. Thus, the rotation of the second power transmitting shaft 51 is not transmitted to the third power transmitting shaft 59. Accordingly, the shift position changing mechanism 36 is set to the "neutral position."

As thus described, changes between the low speed transmission ratio and the high speed transmission ratio and shift position changes are made. Hence, as shown in FIG. 6, if both of the transmission ratio changing hydraulic clutch 53 and the first shift position changing hydraulic clutch 61 are in the disconnected states while the second shift position changing hydraulic clutch 62 is in the connected state, the shift position is set to a "low speed and forward position." If both of the transmission ratio changing hydraulic clutch 53 and the second shift position changing hydraulic clutch 62 are in the connected states while the first shift position changing hydraulic clutch 61 is in the disconnected state, the shift position is set to a "high speed and forward position." If both the first shift position changing hydraulic clutch 61 and the second shift position changing hydraulic clutch 62 are in the disconnected states, the shift position is set to the neutral position, regardless of any states of the transmission ratio changing clutch 53. If both of the transmission ratio changing hydraulic clutch 53 and the second shift position changing hydraulic clutch 62 are in the disconnected states while the first shift position changing hydraulic clutch 61 is in the connected state, the shift position is set to a "low speed and reverse position." If both of the transmission ratio changing hydraulic clutch 53 and the first shift position changing hydraulic clutch 61 are in the connected states while the second shift position changing hydraulic clutch 62 is in the disconnected state, the shift position is set to a "high speed and forward position."

Control Block of Boat

Next, mainly referring to FIG. 5, a control block of the boat 1 will be described.

First, with reference to FIG. 5, the control block of the outboard motor 20 will be described. The outboard motor 20 preferably includes a control device 86. The control device 86 is arranged to control the respective mechanisms of the outboard motor 20. The control device 86 preferably includes a central processing unit (CPU) 86a working as a calculating section, and memory 86b. Various settings such as, for example, maps described below are stored in the memory 86b. The memory 86b is connected to the CPU 86a. The CPU 86a reads necessary pieces of information stored in the memory 86b when executing various calculations. Also, if necessary, the CPU 86a outputs calculation results to the memory 86b and makes the memory 86b store them.

Additionally, the CPU 86a can be placed at locations other than the outboard motor 20. For example, the CPU 86a can be placed in a controller 82 which will be described below. The CPU 86a could also be divided into a CPU that controls the output of the engine 30 and another CPU that controls the shift mechanism 34. In this alternative preferred embodiment, both the CPUs may be separately placed, i.e., the CPU controlling the output of the engine 30 can be placed in the outboard motor 20 and the CPU controlling the shift mechanism 34 can be placed in the controller 82.

A throttle body 87 of the engine 30 is connected to the control device 86. The control device 86 controls the throttle body 87. Thereby, a rotational speed of the engine 30 is controlled. As a result, the output of the engine 30 is controlled.

An engine rotational speed sensor 88 is connected to the control device 86. The engine rotational speed sensor 88 is arranged to detect a rotational speed of the crankshaft 31 of the engine 30 shown in FIG. 1. The engine rotational speed sensor 88 outputs the detected engine rotational speed to the control device 86.

A torque sensor 89 is preferably placed between the engine 30 and the propeller 41. The torque sensor 89 detects torque generated between the engine 30 and the propeller 41. The torque sensor 89 outputs the detected torque to the control device 86.

The torque sensor 89 can be positioned at any location insofar as it is located between the engine 30 and the propeller 41. The torque sensor 89 can be placed at, for example, the crankshaft 31; any one of the first, second, and third power transmitting shafts 50, 51, 59; the propeller shaft 40 and so forth. The torque sensor 89 can be, for example, a magnetostrictive sensor or the like.

The propulsion unit 33 preferably has a propeller rotational speed sensor 90. The propeller rotational speed sensor 90 is arranged to detect a rotational speed of the propeller 41. The propeller rotational speed sensor 90 outputs the detected rotational speed to control device 86. Additionally, the rotational speed of the propeller 41 and the rotational speed of the propeller shaft 40 are the same, or substantially the same as each other. Accordingly, the propeller rotational speed sensor 90 can be a sensor that detects a rotational speed of the propeller shaft 40.

The transmission ratio changing electromagnetic valve 72, the forward shift position connecting electromagnetic valve 74, and the reverse shift position connecting electromagnetic valve 73 are also connected to the control device 86. The control device 86 controls the transmission ratio changing electromagnetic valve 72, the forward shift position connecting electromagnetic valve 74, and the reverse shift position connecting electromagnetic valve 73.

As shown in FIG. 5, the boat 1 has a local area network (LAN) 80 extending around in the hull 10. In the boat 1, signals are sent and received among devices through the LAN 80.

The control device 86 of the outboard motor 20, the controller 82, and a display device 81 are connected to the LAN 80. The control device 86 outputs the detected engine rotational speed, the propeller rotational speed and so forth. The display device 81 is arranged to display the respective pieces of information outputted from the control device 86 and/or outputted from the controller 82 described below. More specifically, the display device 81 displays a current speed, a current shift position, etc. of the boat 1.

The controller 82 preferably includes a control lever 83, an accelerator opening sensor 84, and a shift position command sensor 85 working as a shift position command detecting section. The control lever 83 is arranged to be operated by an operator of the boat 1, and inputs a shift position command and an accelerator opening. More specifically, when the operator of the boat 1 operates the control lever 83, an accelerator opening and a shift position command corresponding to a state of the control lever 83 are detected by the accelerator opening sensor 84 and the shift position command sensor 85, respectively. The accelerator opening sensor 84 and the shift position command sensor 85 are connected to the LAN 80. The accelerator opening sensor 84 and the shift position command sensor 85 send the accelerator opening and the shift position command to the LAN 80, respectively.

Additionally, the control lever 83 can be electronically operable or mechanically operable. An electronically operable control lever is preferably a control lever in which an operational amount of the control lever is sensed by a sensor and the detected operational amount of the control lever is sent, as an electric signal, to the control device 86, for example. On the other hand, a mechanically operable control lever is a control lever in which a mechanical wire moving with the control lever is connected to the control lever, for example. A movement amount of the wire and a movement direction of the wire can be detected internally or externally of the outboard motor 20. The detected movement amount and movement direction of the wire are sent to the control device 86.

The control device 86 receives an accelerator opening signal and a shift position command signal outputted from the accelerator opening sensor 84 and the shift position command sensor 85, respectively, through the LAN 80.

Control of Boat

Next, the control of the boat 1 will be described.

Fundamental Control of Boat

Upon an operation of the control lever 83 by the operator of the boat 1, the accelerator opening sensor 84 and the shift position command sensor 85 are arranged to detect an accelerator opening and a shift position command corresponding to a state of the control lever 83, respectively. The detected accelerator opening and shift position command are sent to the LAN 80. The control device 86 receives the accelerator opening and the shift position command outputted through the LAN 80. The control device 86 is arranged to control the throttle body 87 in response to the accelerator opening signal. Thereby, the control device 86 controls the output of the engine 30.

The control device 86 controls the shift mechanism 34 in response to the shift position command signal. More specifically, when receiving the shift position command signal indicative of the "low speed and forward position," the control device 86 controls the transmission ratio changing electromagnetic valve 72 to drive the transmission ratio changing hydraulic clutch 53 into the disconnected state. The control device 86 also controls the reverse shift position connecting electromagnetic valve 73 to drive the first shift position changing hydraulic clutch 61 into the disconnected state and controls the forward shift position connecting electromagnetic valve 74 to drive the second shift position changing hydraulic clutch 62 into the connected state. Thereby, the shift mechanism 34 is set to the "low speed and forward position."

Specific Controls of Boat (1) Shift-In Inhibited Period

In this preferred embodiment, once the shift position is changed from one of the forward and the reverse positions to the other position, the control device 86 shown in FIG. 5 inhibits a change to the one of the forward and the reverse positions again until a predetermined shift-in inhibited period elapses. That is, in this preferred embodiment, shift position changes between the forward and reverse positions are inhibited during the shift-in inhibited period. However, the shift position change to the neutral position from the forward position or the reverse position is not necessarily inhibited. More specifically, if a signal that causes the shift position to be changed to the other side position is outputted from the shift position command sensor 85 during the shift-in inhibited period, the control device 86 does not allow the shift position to be changed to the other side position but allows the shift position to be maintained at the current position or to be changed to the neutral position. In the case where the shift position is changed to the neutral position, the control device 86 may allow the shift position to be maintained at the neutral position or, for example, to be changed back to the previous position from the neutral position until the shift-in inhibited period elapses. In this preferred embodiment, the case in which the shift position is kept at the neutral position will be described, as an example, below.

Additionally, the shift-in inhibited period is a period of time that is previously determined. The memory 86b shown in FIG. 5 stores the predetermined shift-in inhibited period. The shift-in inhibited period can be properly determined in accordance with characteristics of the boat 1 and/or the outboard motor 20. The shift-in inhibited period can be, for example, about 0.1-10 seconds, preferably about 0.2-1 second, and more preferably about 0.5 seconds.

The shift-in inhibited period starts not only when the shift position is changed from one of the forward and the reverse positions to the other position but also when the shift position is changed from the neutral position to the forward or the reverse position.

Figure 7:
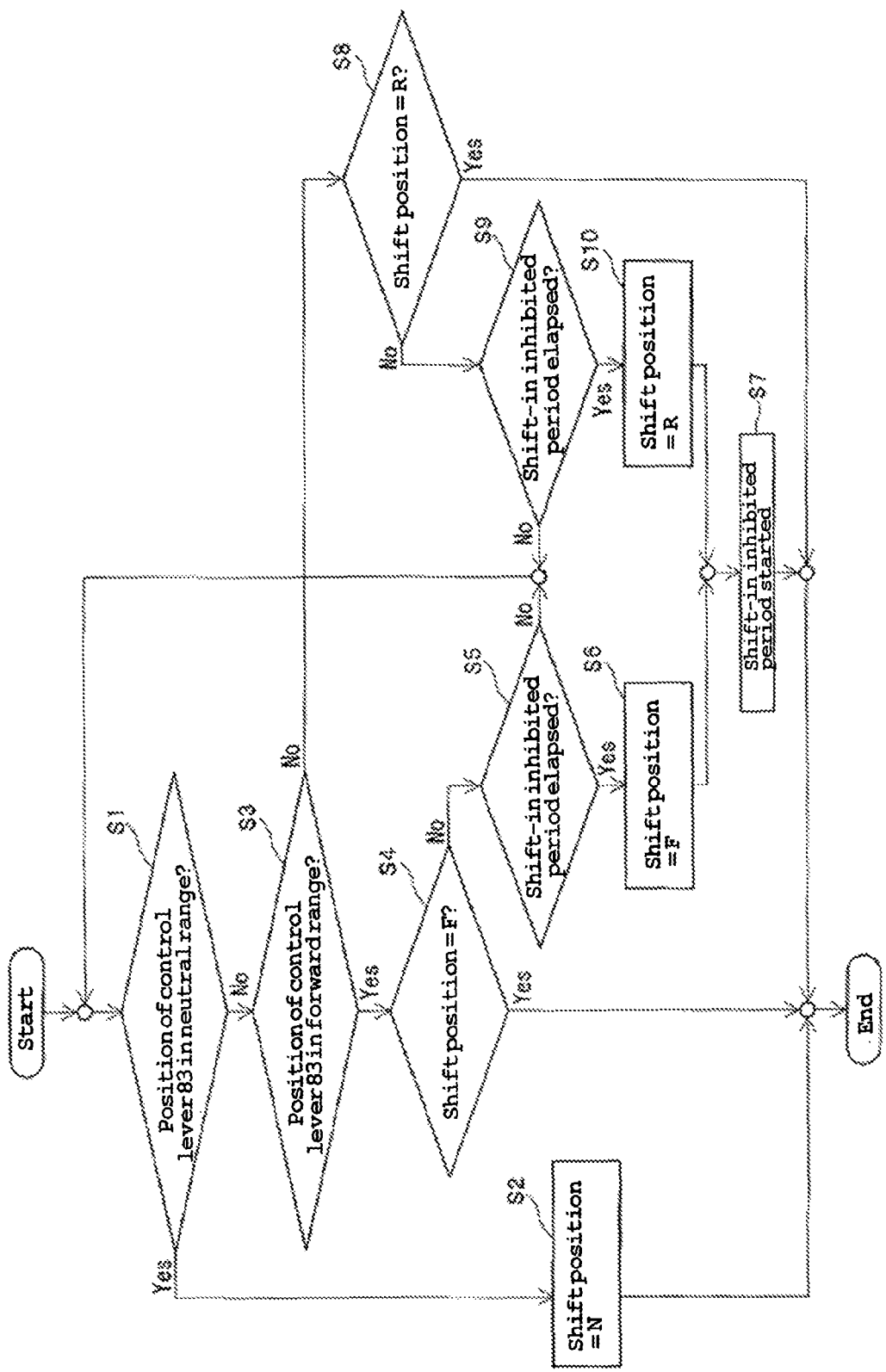
FIG. 7 is a flowchart showing a shift position change control routine executed in the first preferred embodiment of the present invention.

With reference to FIG. 7, the shift-in inhibited period will be described in more detail below. FIG. 7 is a flowchart showing a control routine executed under the condition that the boat operator operates the control lever 83 to one of the shift positions corresponding to the forward position or the reverse position when the shift position is set at any one of the forward, reverse, and neutral positions.

As shown in FIG. 7, in step S1, the CPU 86a determines based upon an output from the shift position command sensor 85 whether a position of the control lever 83 is placed in a neutral range or not. If the CPU 86a determines, in step S1, that the position of the control lever 83 is placed in the neutral range, the process goes to step S2. In step S2, the CPU 86a controls the actuator 70 to actuate the shift position changing mechanism 36 to the neutral position.

On the other hand, if the CPU 86a determines in step S1 that the position of the control lever 83 is not placed in the neutral range, the process goes to step S3. The CPU 86a determines, in step S3, based upon an output from the shift position command sensor 85 whether the position of the control lever 83 is placed in a forward range or not. If the CPU 86a determines, in step S3, that the position of the control lever 83 is placed in the forward range, the process goes to step S4.

In step S4, the CPU 86a determines whether the shift position changing mechanism 36 is in the forward position or not. That is, the CPU 86a determines, in step S4, whether the second shift position changing hydraulic clutch 62 is in the connected state or not. If, in step S4, the CPU 86a determines that the shift position changing mechanism 36 is in the forward position, the control routine ends.

Meanwhile, if the CPU 86a determines, in step S4, that the shift position changing mechanism 36 is not in the forward position, the process goes to step S5.

In step S5, the CPU 86a determines whether the shift-in inhibited period has elapsed or not. If, in step S5, the CPU 86a determines that the shift-in inhibited period has not elapsed, the process returns to step S1. That is, if the shift-in inhibited period still continues, the process returns to step S1 from step S5.

Meanwhile, if the CPU 86a determines in step S5, that the shift-in inhibited period has elapsed, the process goes to step S6.

In step S6, the CPU 86a controls the actuator 70 to actuate the shift position changing mechanism 36 to the forward position.

After executing step S6, the CPU 86a executes step S7. In step S7, the CPU 86a starts the shift-in inhibited period.

If, in step S3, the CPU 86a determines that the position of the control lever 83 is not in the forward range, the process goes to step S8. That is, if the CPU 86a determines, in step S3, that the position of the control lever 83 is in the reverse range, the process goes to step S8. In step S8, the CPU 86a determines based upon the output from the shift position command sensor 85 whether the shift position changing mechanism 36 is in the reverse position or not. That is, the CPU 86a determines, in step S8, whether the first shift position changing hydraulic clutch 61 is in the connected state or not. If, in step S8, the CPU 86a determines that the shift position changing mechanism 36 is in the reverse position, the control routine ends.

However, if in step S8 the CPU 86a determines that the shift position changing mechanism 36 is not in the reverse position, the process goes to step S9. In step S9, the CPU 86a determines whether the shift-in inhibited period has elapsed or not. If, in step S9, the CPU 86a determines that the shift-in inhibited period has not elapsed, the process returns to step S1. That is, if the shift-in inhibited period still continues, the process returns to step S1.

Meanwhile, if the CPU 86a determines, in step S9, that the shift-in inhibited period has elapsed, the process goes to step S10. In step S10, the CPU 86a controls the actuator 70 to actuate the shift position changing mechanism 36 to the reverse position.

After executing step S10, the CPU 86a executes step S7. In step S7, the CPU 86a starts the shift-in inhibited period.

If the control lever 83 is operated to the position corresponding to the forward position or the reverse position before the shift-in inhibited period elapses, the CPU 86a determines, in step S5 or step S9, that the shift-in inhibited period has not elapsed. Accordingly, until the shift-in inhibited period elapses, the shift position changing mechanism 36 cannot be actuated to the forward position or the reverse position.

Referring to a specific exemplary control shown in FIG. 8, the shift-in inhibited period will be described in further detail. For example, in the control example shown in FIG. 8, an operation of the control lever 83 to the reverse range from the forward range is started at time (t0). In step S1 shown in FIG. 7, the CPU 86a determines that the position of the control lever 83 is placed in the range corresponding to the neutral position at time (t1). Hence, the second shift position changing hydraulic clutch 62 is brought into the disconnected state. Thereby, the shift position changing mechanism 36 is temporarily laid at the neutral position. Afterwards, at time (t2) where the control lever 83 comes out of the range corresponding to the neutral position and reaches the range corresponding to the reverse position, the CPU 86a determines, in step S3 shown in FIG. 7, that the position of the control lever 83 is not placed in a range corresponding to the forward position. Therefore, the process goes to step S8. Under this condition, because the first shift position changing hydraulic clutch 61 is not in the connected state, the process goes to step S9 from step S8. Also, because the process is not in the shift-in inhibited period, the process goes to step S10 from step S9. In step S10, the shift position changing mechanism 36 is actuated to the reverse position. Afterwards, in step S7 shown in FIG. 7, the CPU 86a starts the shift-in inhibited period at time (t2).

Figure 8:
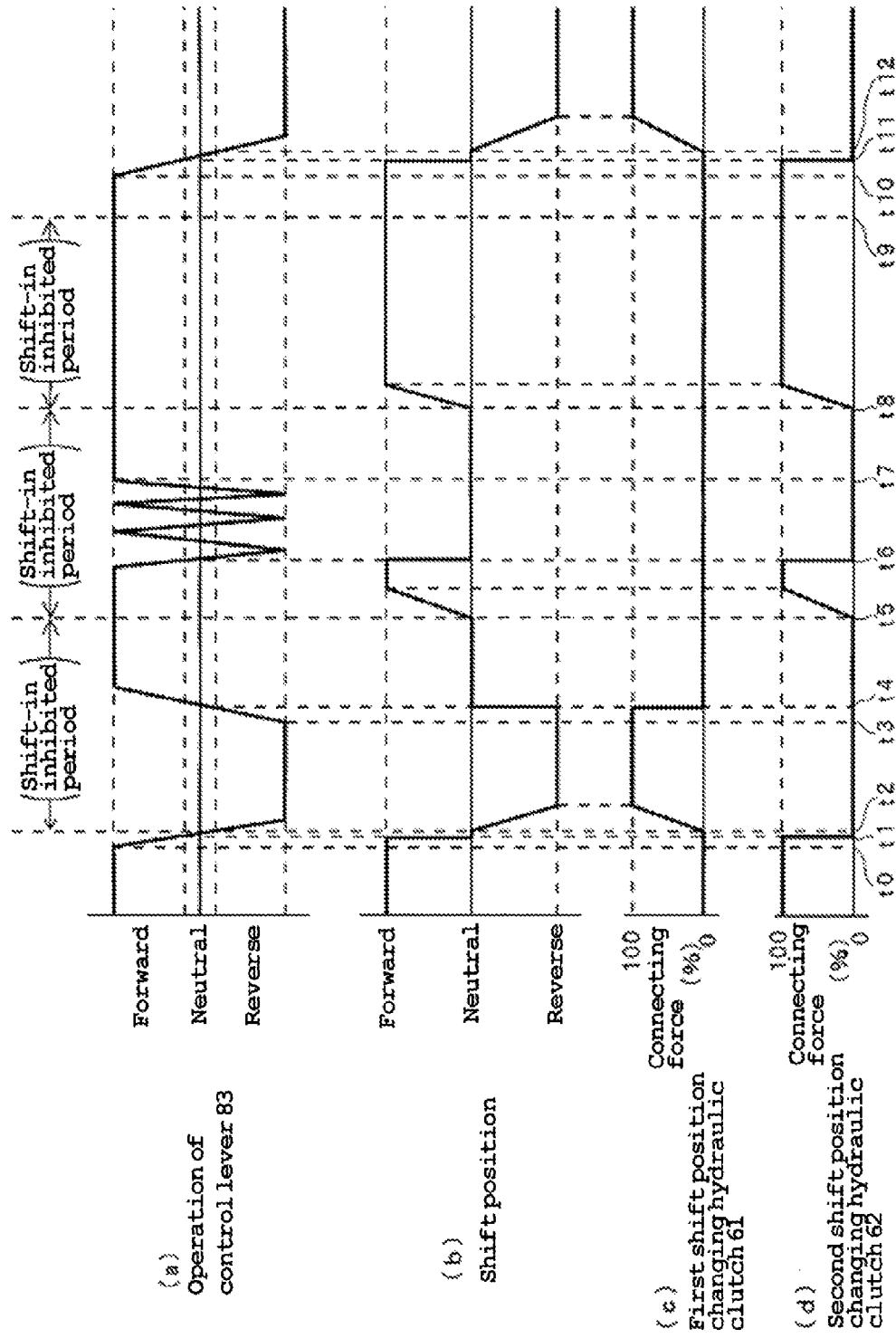
FIG. 8 is a graph showing temporal changes as to command positions of a control lever, shift positions of a shift position changing mechanism, and connecting forces of first and second shift position changing hydraulic clutches in the first preferred embodiment of the present invention. More specifically, section (a) shows the temporal change of the command position of the control lever. Section (b) shows the temporal change of the shift position of the shift position changing mechanism. Section (c) shows the temporal change of the connecting force of the first shift position changing hydraulic clutch. Section (d) shows the temporal change of the connecting force of the second shift position changing hydraulic clutch.

In the control shown in FIG. 8, at time (t3), the control lever 83 is again operated to the forward range from the reverse range. Steps S1 through S5 shown in FIG. 7 are thus executed. Because time (t3) is in the shift-in inhibited period (t2)-(t5), the CPU 86a determines, in step S5 shown in FIG. 7, that the shift-in inhibited period has not elapsed yet. The process goes to step S1 from step S5 and further to step S2, accordingly. In step S2, the shift position changing mechanism 36 is actuated to the neutral position from the reverse position, as shown in FIG. 8.

The position of the control lever 83 is kept in the forward range during the period between time (t4) and time (t5). However, in step S5 and step S9 shown in FIG. 7, the CPU 86a determines that the shift-in inhibited period has not elapsed. The shift position changing mechanism 36 thus is not actuated to the forward position or the reverse position. Accordingly, the shift position changing mechanism 36 stays at the neutral position before time (t5).

In the control shown in FIG. 8, the position of the control lever 83 is kept in the forward range after the shift-in inhibited period (t2)-(t5) has elapsed. In step S5 shown in FIG. 7, the CPU 86a determines that the shift-in inhibited period elapsed at time (t5). The process thus goes to step S6. At time (t5), as shown in FIG. 8, the connecting operation of the second shift position changing hydraulic clutch 62 is initiated. Consequently, the shift position changing mechanism 36 is actuated to the forward position from the neutral position. Then, the CPU 86a executes step S7 shown in FIG. 7. Therefore, the shift-in inhibited period is again started at time (t5).

In the control shown in FIG. 8, the control lever 83 is operated multiple times between the forward range and the reverse range during a period between time (t6) and time (t7). Because the period (t6)-(t7) is in the shift-in inhibited period (t5)-(t8), the CPU 86a thus determines, in step S5 and step S9 shown in FIG. 7, that the shift-in inhibited period has not elapsed at every operation of the control lever 83. The process, therefore, does not go to step S6 or step S10, and the shift position changing mechanism 36 is not actuated to the forward position or the reverse position. Accordingly, the shift position changing mechanism 36 stays at the neutral position before time (t8) after time (t6).

In the control shown in FIG. 8, the position of the control lever 83 at time (t8) is in the forward range. The process thus goes to step S6 shown in FIG. 7 from step S5 at time (t8). Hence, the connecting operation of the second shift position changing hydraulic clutch 62 is initiated in step S6, and the shift position changing mechanism 36 is actuated to the forward position. Afterwards, in step S7 shown in FIG. 7, the shift-in inhibited period starts again. More specifically, a period between time (t8) and time (t9) is the shift-in inhibited period as shown in FIG. 8.

In the control shown in FIG. 8, at time (t10), an operation of the control lever 83 to the reverse range from the forward range is started, and, at time (t11), the control lever 83 is in the neutral position. At time (t12), the shift-in inhibited period (t8)-(t9) has already elapsed. The CPU 86a thus determines, in step S9 shown in FIG. 7, that the shift-in inhibited period has elapsed. The process then goes to step S10. Consequently, at time (t12), the connecting operation of the first shift position changing hydraulic clutch 61 is initiated. Thereby, the shift position changing mechanism 36 is actuated to the reverse position.

(2) Gradual Increase of Connecting Force of First Shift Position Changing Hydraulic Clutch and Second Shift Position Changing Hydraulic Clutch In this preferred embodiment, the connecting force of the first shift position changing hydraulic clutch 61 or the second shift position changing hydraulic clutch 62 is gradually increased when the shift position changing mechanism 36 is actuated to the forward position or the reverse position from the neutral position after the shift-in inhibited period has elapsed. Thereby, the first shift position changing hydraulic clutch 61 or the second shift position changing hydraulic clutch 62 is slowly brought into the connected state.

For example, referring to the control shown in FIG. 8, the gradual increase of the connecting force of the second shift position changing hydraulic clutch 62 starts at time (t5) and at time (t8).

In this preferred embodiment, the connecting force of the first or second shift position changing hydraulic clutch 61, 62 is not only gradually increased in the shift-in period after the shift-in inhibited period has elapsed but also is properly and gradually increased in response to changes of the engine rotational speed and so forth.

More specifically, at time (t5) of FIG. 8, the shift position command sensor 85 sends the shift position command signal indicative of the forward position to the control device 86 through the LAN 80.

Figure 9:
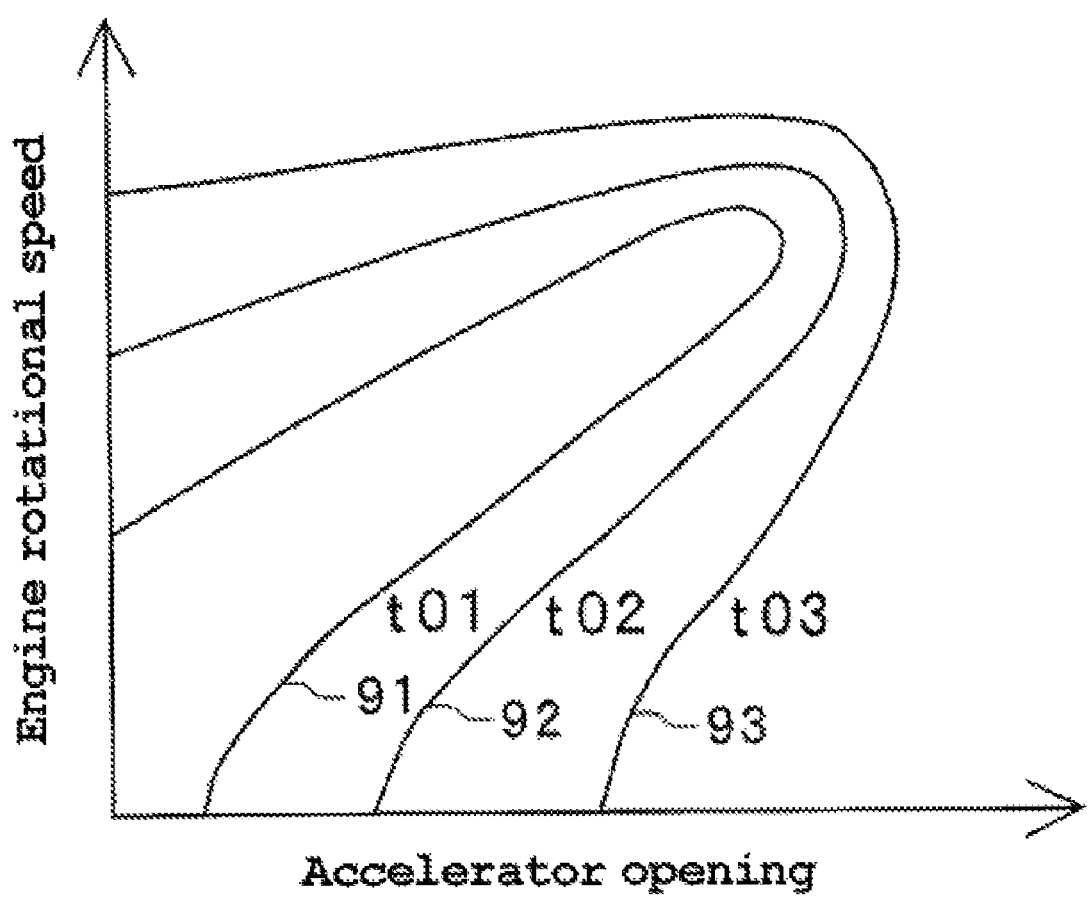
FIG. 9 is a map indicating relationships of connecting periods of time with the accelerator opening and with the engine rotational speed.

First, the CPU 86a preferably reads out a map shown in FIG. 9 and stored in the memory 86b, for example. The map shown in FIG. 9 is a map indicating relationships of connecting periods of the clutch with the accelerator opening and with the engine rotational speed. The CPU 86a decides a connecting period of the second shift position changing hydraulic clutch 62 based upon the map of FIG. 9. That is, the CPU 86a decides the connecting period of the second shift position changing hydraulic clutch 62 based upon the accelerator opening and the engine rotational speeds.

The term "connecting period" of the clutch means a period of time from a time at which the connecting operation of the clutch is initiated to a time at which the connecting operation of the clutch is completed. More specifically, the term "connecting period" of the clutch means a period of time from a time at which the connecting operation of the clutch is initiated to a time at which an output shaft starts rotating with an input shaft at the same rotational speed. Additionally, in this preferred embodiment, the sentence "the connecting operation of clutch is initiated" means that a drive of a hydraulic cylinder for the clutch is initiated.

Specifically, the connecting period of the second shift position connecting hydraulic clutch 62 is derived by applying the accelerator opening and the engine rotational speed immediately before initiation of the connecting operation of the second shift position connecting hydraulic clutch 62 to the map shown in FIG. 9. For example, if a point corresponding to the accelerator opening and the engine rotational speed immediately before initiation of the connecting operation of the second shift position connecting hydraulic clutch 62 is plotted between line 91 and line 92 of FIG. 9, connecting period (t01) is provided. If a point corresponding to the accelerator opening and the engine rotational speed immediately before initiation of the connecting operation of the second shift position connecting hydraulic clutch 62 is plotted between the line 92 and line 93 of FIG. 9, connecting period (t02) is provided. Similarly, if a point corresponding to the accelerator opening and the engine rotational speed immediately before initiation of the connecting operation of the second shift position connecting hydraulic clutch 62 is plotted out of the line 93 of FIG. 9, connecting period (t03) is provided. The following condition needs to be satisfied:

$$(t01)<(t02)<(t03)$$

Figure 10:
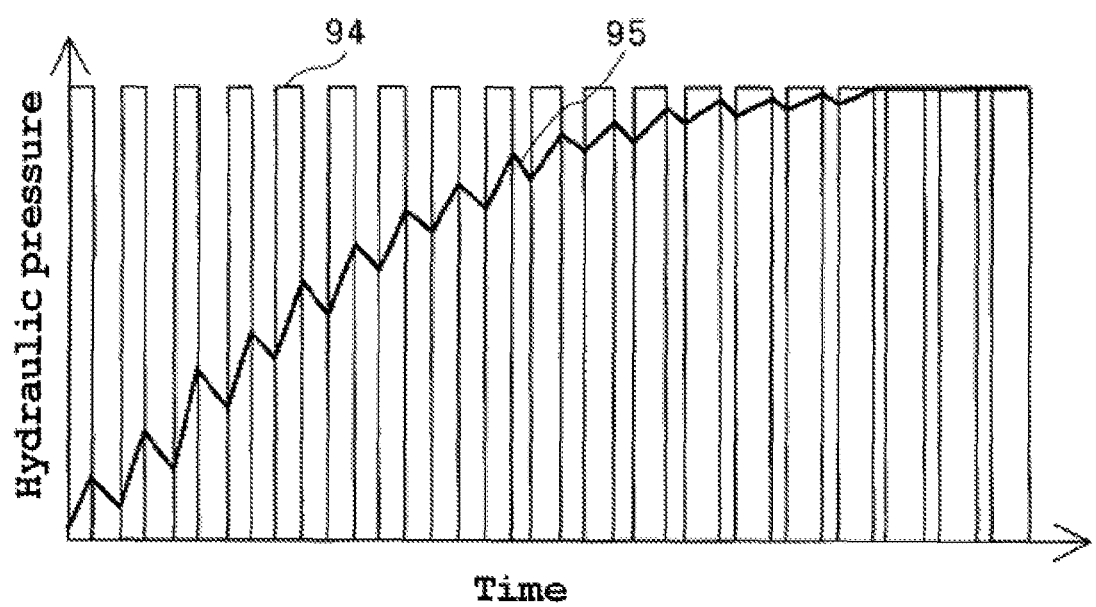
FIG. 10 is a graph showing PWM signals outputted to a forward shift position connecting electromagnetic valve in a situation in which the second shift position changing hydraulic clutch is brought into a connected state within a connecting period of time, and hydraulic pressure provided in response to the PWM signals.
Figure 11:
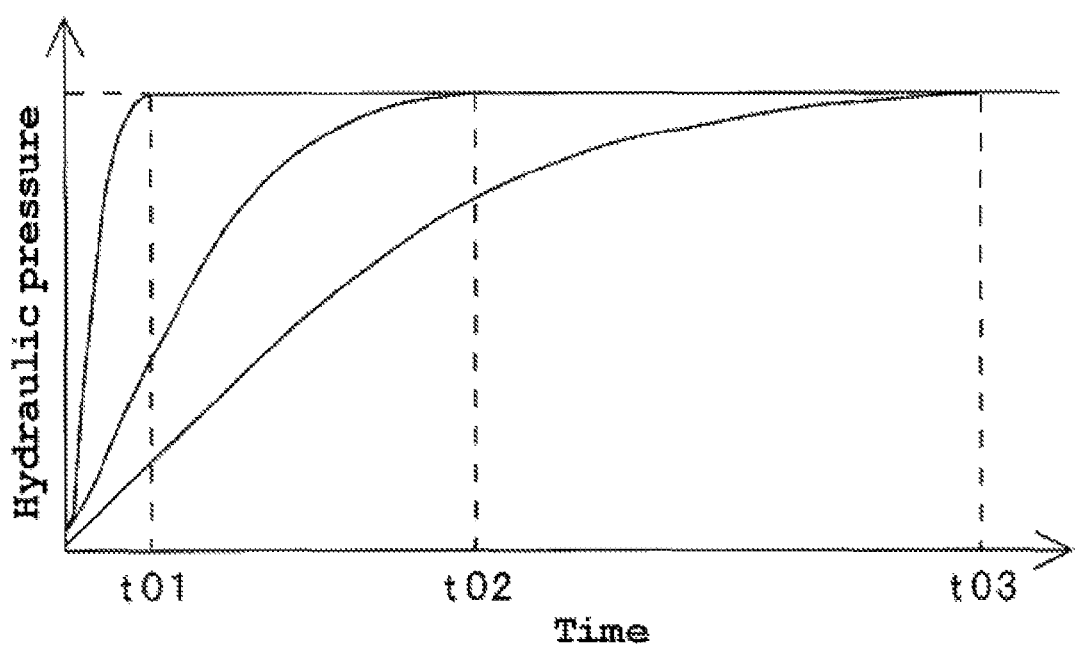
FIG. 11 is a graph showing the temporal change of the hydraulic pressure of the second shift position changing hydraulic clutch, wherein the lines of the graph correspond to connecting periods of time (t01), (t02), and (t03).

The CPU 86a controls the forward shift position connecting electromagnetic valve 74 so that the second shift position connecting hydraulic clutch 62 is connected within the provided connecting period. Specifically, for example, if the provided connecting period is (t03), the CPU 86a, as shown in FIGS. 10 and 11, gradually increases hydraulic pressure of the hydraulic piston 62a shown in FIG. 3 so that the second shift position connecting hydraulic clutch 62 is completely brought into the connected state when the connecting period (t03) elapses. More specifically, as shown in FIG. 10, the CPU 86a gradually increases a duty ratio of each duty signal outputted to the forward shift position connecting electromagnetic valve 74 so that the duty ratio becomes 100% when the connecting period (t03) elapses. Thereby, the hydraulic pressure of the hydraulic piston 62a is gradually increased. Therefore, the connecting force of the second shift position connecting hydraulic clutch 62 is gradually increased. Additionally, line 94 shown in FIG. 10 indicates the duty signal outputted to the forward shift position connecting electromagnetic valve 74. Also, thick line 95 indicates the hydraulic pressure of the second shift position connecting hydraulic clutch 62.

Meanwhile, if, for example, the provided connecting period is (t02), the CPU 86a, as shown in FIG. 11, gradually increases the hydraulic pressure of the hydraulic piston 62a shown in FIG. 3 so that the second shift position connecting hydraulic clutch 62 is completely brought into the connected state when the connecting period (t02) elapses. Similarly, if the provided connecting period is (t01), the CPU 86a, as shown in FIG. 11, gradually increases the hydraulic pressure of the hydraulic piston 62a shown in FIG. 3 so that the second shift position connecting hydraulic clutch 62 is completely brought into the connected state when the connecting period (t01) elapses.

Additionally, referring to FIGS. 10 and 11, the exemplary controls are described above, such that the connecting force is gradually increased during the period between the initiation of the connecting operation of the first shift position connecting hydraulic clutch 61 or the second shift position connecting hydraulic clutch 62 and the completion thereof. That is, the exemplary controls are described above such that the connecting force of the clutch is gradually changed so that that a rate of change of the connecting force of the clutch gradually becomes smaller. It should be noted that the present invention is not limited to the above exemplary controls.

Figure 12:
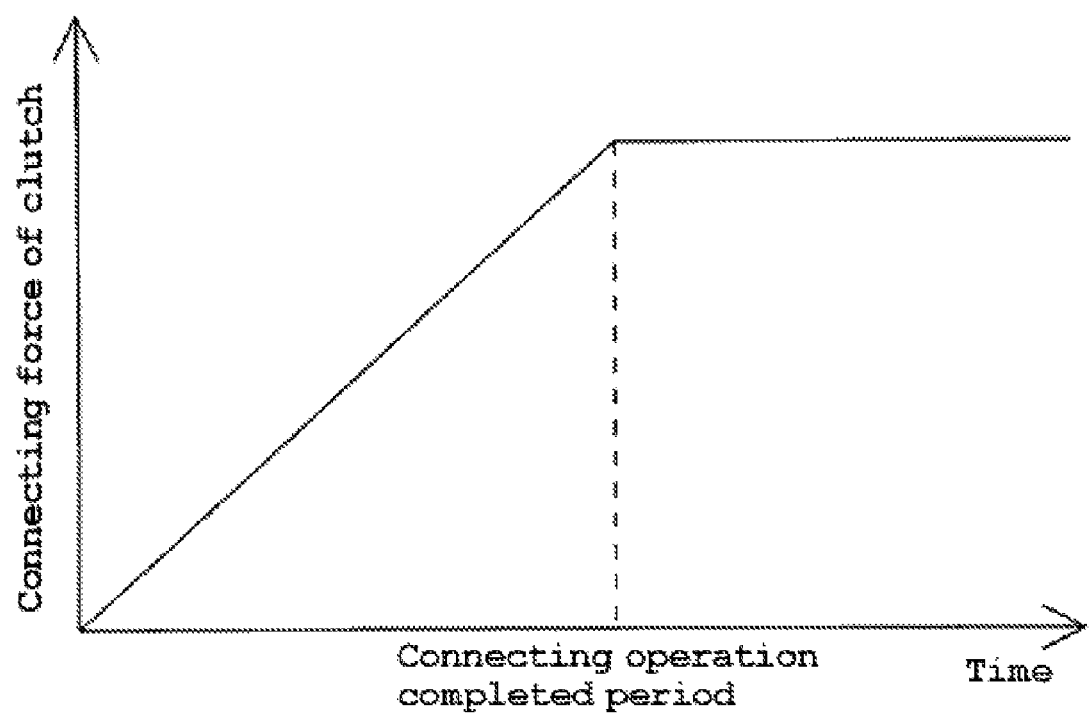
FIG. 12 is a graph showing the temporal change of the connecting force of the shift position changing hydraulic clutch in a situation in which the shift position changing mechanism is actuated to a forward position or a reverse position from a neutral position, in a first variation of a preferred embodiment of the present invention.

For example, as shown in FIG. 12, the connecting force can be monotonously or linearly increased during the period between the initiation of the connecting operation of the first shift position connecting hydraulic clutch 61 or the second shift position connecting hydraulic clutch 62 and the completion thereof.

Figure 13:
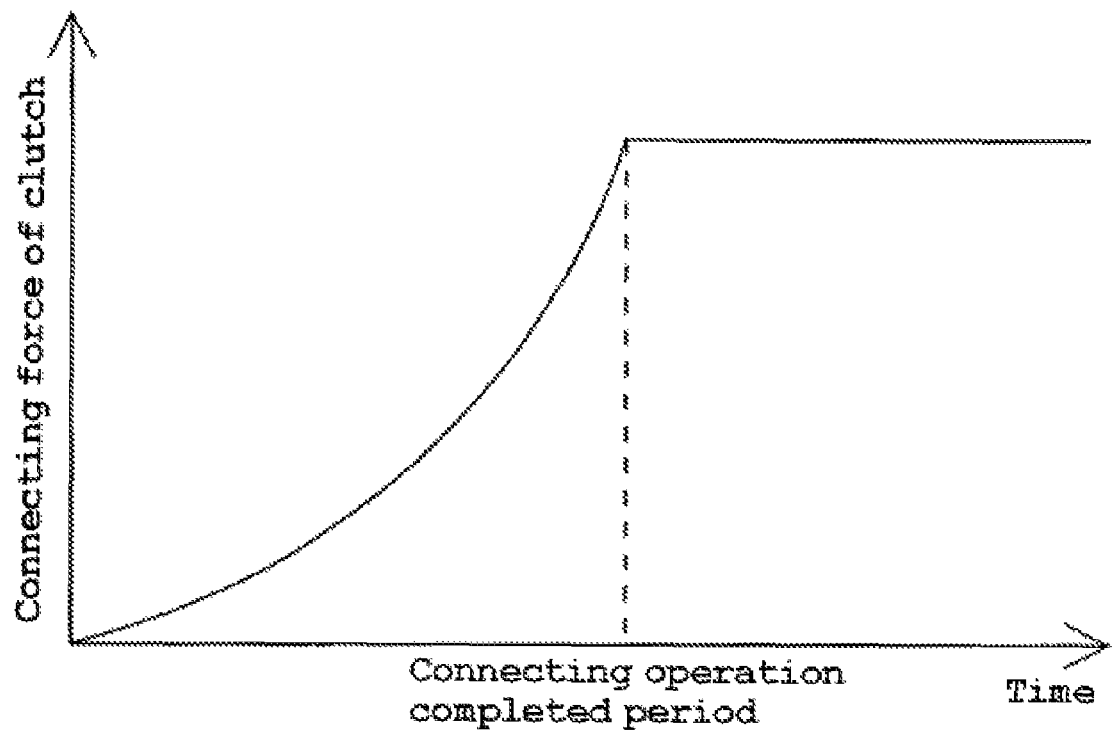
FIG. 13 is a graph showing the temporal change of the connecting force of the shift position changing hydraulic clutch in the situation in which the shift position changing mechanism is actuated to the forward position or the reverse position from the neutral position, in a second variation of a preferred embodiment of the present invention.

As shown in FIG. 13, the connecting force can be increased in such a manner that the rate of change of the connecting force of the clutch becomes gradually larger during the period between the initiation of the connecting operation of the first shift position connecting hydraulic clutch 61 or the second shift position connecting hydraulic clutch 62 and the completion thereof.

Figure 14:
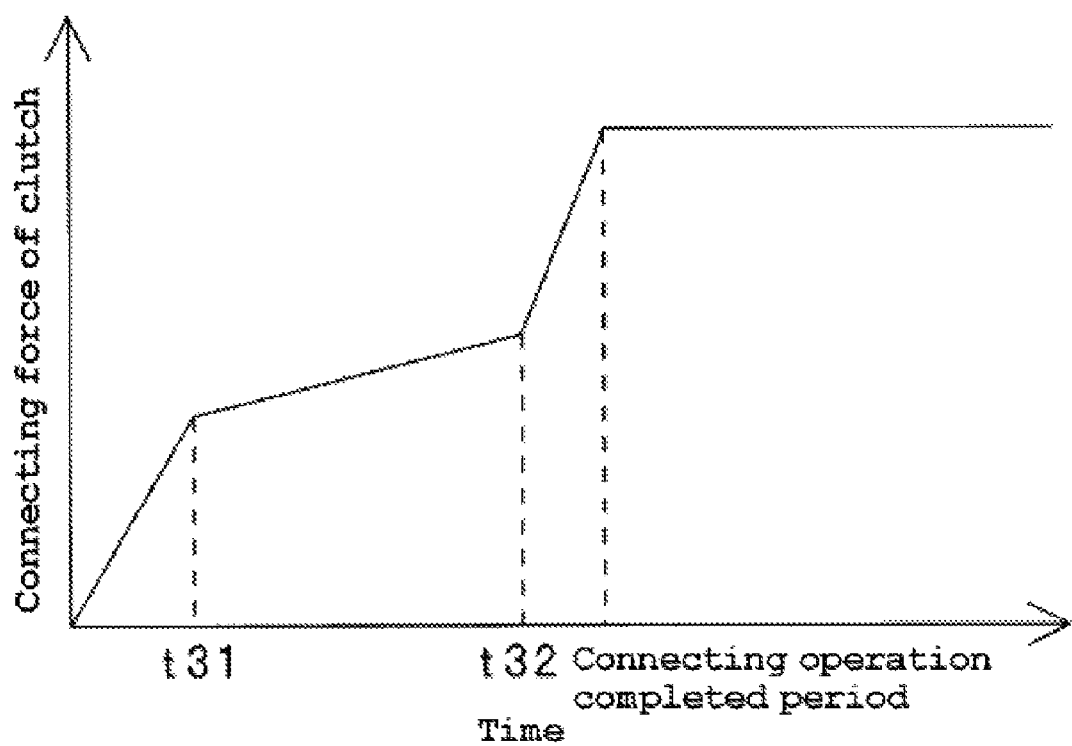
FIG. 14 is a graph showing the temporal change of the connecting force of the shift position changing hydraulic clutch in the situation in which the shift position changing mechanism is actuated to the forward position or the reverse position from the neutral position, in a third variation of a preferred embodiment of the present invention.

Also, as shown in FIG. 14, the connecting force of the first shift position connecting hydraulic clutch 61 or the second shift position connecting hydraulic clutch 62 can be increased gradually only during a partial period (t31)-(t32) within the period between the initiation of the connecting operation of the first shift position connecting hydraulic clutch 61 or the second shift position connecting hydraulic clutch 62 and the completion thereof. In other words, the connecting force can be suddenly increased during a partial period within the period between the initiation of the connecting operation of the first shift position connecting hydraulic clutch 61 or the second shift position connecting hydraulic clutch 62 and the completion thereof.

Figure 15:
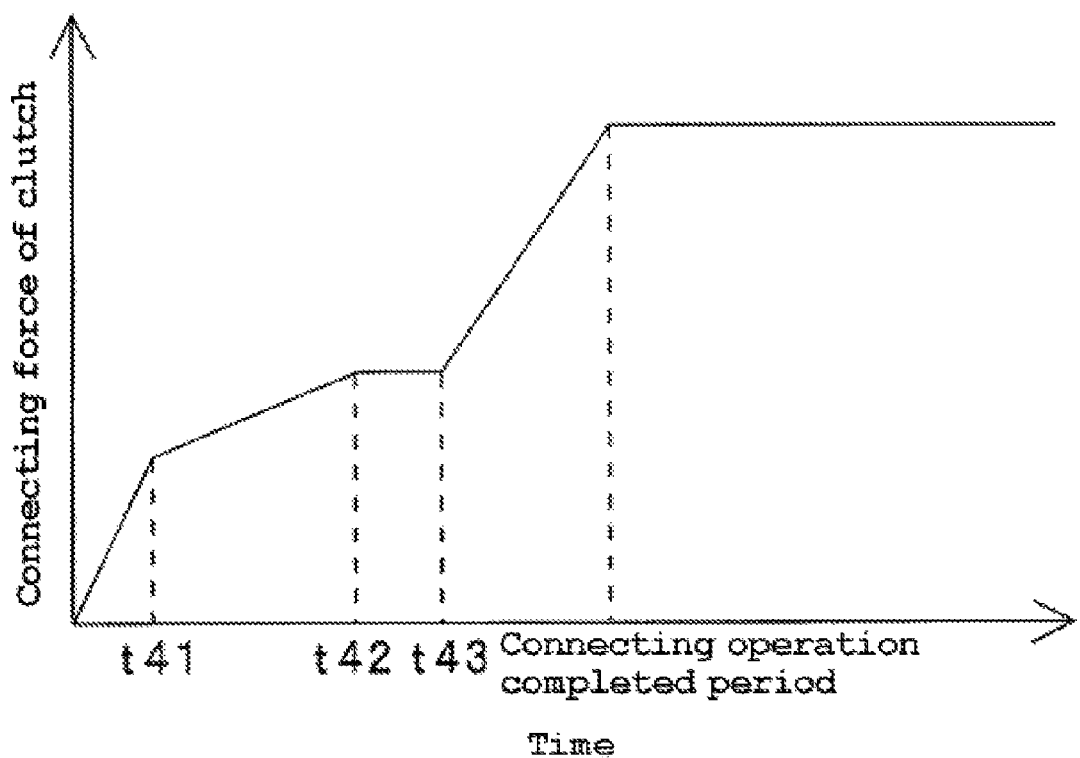
FIG. 15 is a graph showing the temporal change of the connecting force of the shift position changing hydraulic clutch in the situation in which the shift position changing mechanism is actuated to the forward position or the reverse position from the neutral position, in a fourth variation of a preferred embodiment of the present invention.

Further, as shown in FIG. 15, the connecting force can be kept at a fixed magnitude during a partial period (t42)-(t43) within the period between the initiation of the connecting operation of the first shift position connecting hydraulic clutch 61 or the second shift position connecting hydraulic clutch 62 and the completion thereof. More specifically, the connecting force can be gradually changed during the partial period (t41)-(t42) within the period between the initiation of the connecting operation of the first shift position connecting hydraulic clutch 61 or the second shift position connecting hydraulic clutch 62 and the completion thereof. Afterwards, the connecting force can be kept at the fixed magnitude during the following period (t42)-(t43). Then, the connecting force can be suddenly increased after time (t43).

As thus described, it can be properly decided how the connecting force of the shift position changing hydraulic clutches 61, 62 is gradually increased, based upon the characteristics of the clutches 61, 62 or the characteristics of the outboard motor 20 and/or the boat 1.

(3) Decrease of Connecting Force of First Shift Position Changing Hydraulic Clutch or Second Shift Position Changing Hydraulic Clutch, in Accordance with Torque Between Engine and Propeller The CPU 86a decreases the connecting force of the clutch in accordance with the torque between the engine 30 and the propeller 41 detected by the torque sensor 89 in the situation that the connecting force of the clutch is gradually increased when the shift position changing mechanism 36 is actuated to the forward position or the reverse position from the neutral position.

Figure 16:
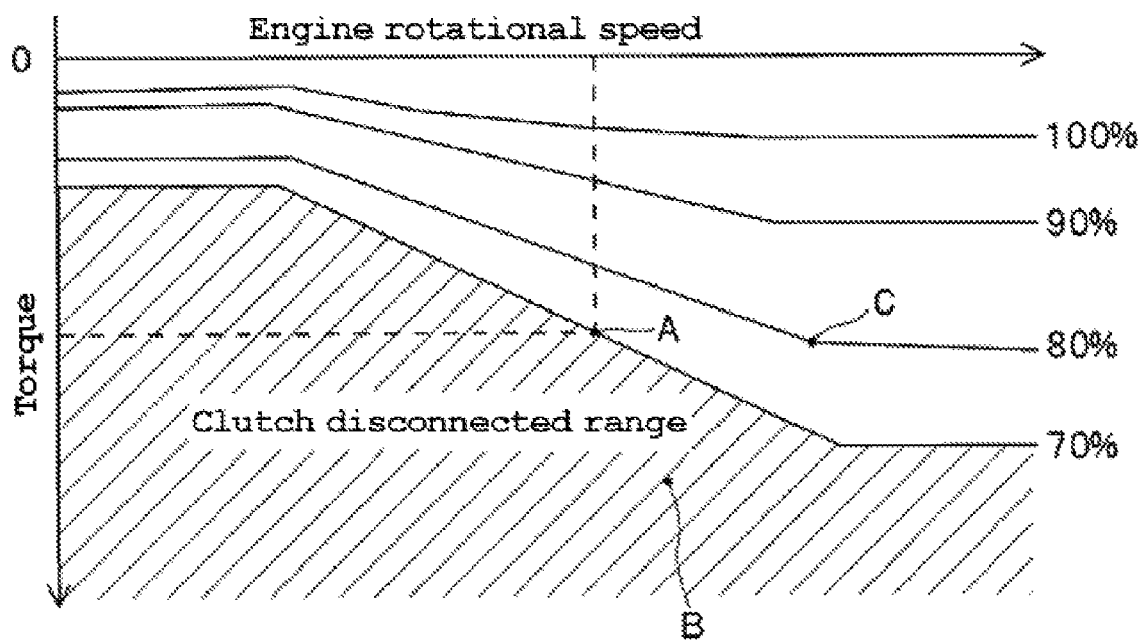
FIG. 16 is a map indicating relationships of the connecting force of the clutch with torque and with the engine rotational speed.

An exemplary control in a situation that the shift position changing mechanism 36 is actuated to the forward position from the neutral position will be specifically described below. The memory 86b stores a control map shown in FIG. 16. The map shown in FIG. 16 is a map indicating the relationship among the connecting force of the second shift position changing hydraulic clutch 62, the torque between the engine 30 and the propeller 41, and the engine rotational speed. For the convenience of description, the map shown in FIG. 16 will be called "torque-connecting force map" below.

The torque sensor 89 detects the torque between the engine 30 and the propeller 41 at predetermined intervals when the second shift position changing hydraulic clutch 62 is brought into the connected state. The torque sensor 89 outputs the detected torque to the control device 86.

The CPU 86a of the control device 86 reads out the torque-connecting force map in the memory 86b. The CPU 86a finds, in the torque-connecting force map, the connecting force of the second shift position changing hydraulic clutch 62 corresponding to the torque detected by the torque sensor 89 and to the engine rotational speed detected by the engine rotational speed sensor 88. The CPU 86a compares the found connecting force of the second shift position changing hydraulic clutch 62 with the current and actual connecting force of the second shift position changing hydraulic clutch 62. If the found connecting force of the second shift position changing hydraulic clutch 62 is smaller than the current and actual connecting force of the second shift position changing hydraulic clutch 62, the CPU 86a controls the actuator 70 to decrease the actual connecting force of the second shift position changing hydraulic clutch 62. More specifically, the CPU 86a controls the actuator 70 to decrease the actual connecting force of the second shift position changing hydraulic clutch 62 down to the found connecting force of the second shift position changing hydraulic clutch 62.

Figure 17:
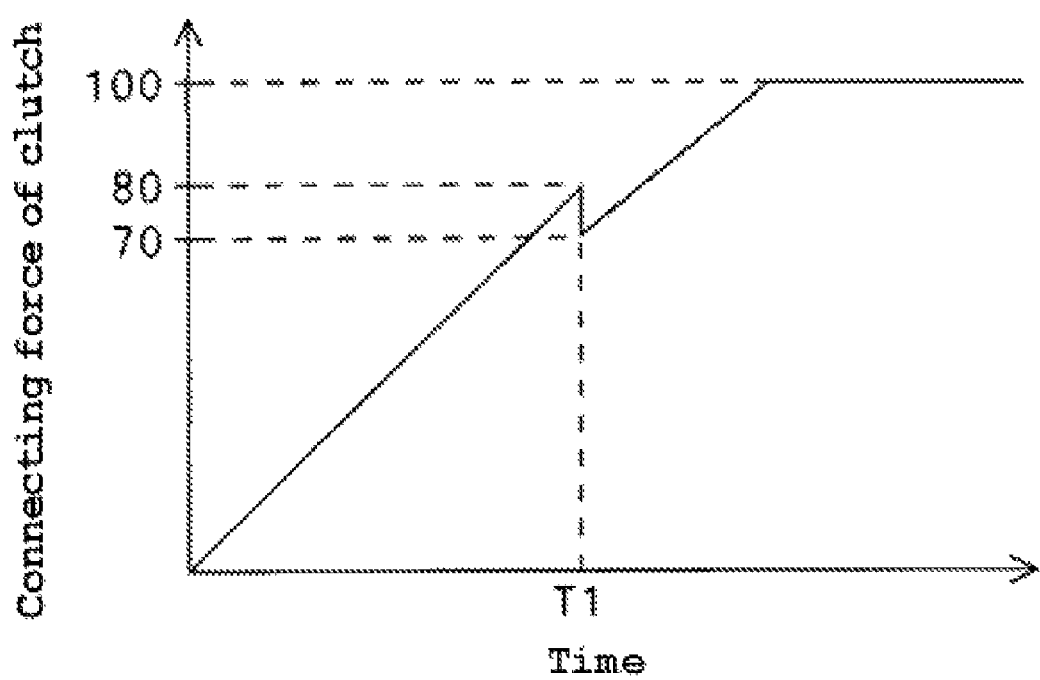
FIG. 17 is a graph showing a change of the connecting force of the clutch at a time (T1) under a condition in which the connecting force of the clutch obtained in the graph of FIG. 16 is smaller than the actual connecting force of the clutch.

For example, assuming that the connecting force of the second shift position changing hydraulic clutch 62 is plotted at point A in the torque-connecting force map of FIG. 16 under the condition, as shown in FIG. 17, that the actual connecting force is about 80% at time (T1), the connecting force of the second shift position changing hydraulic clutch 62 is found to be about 70%. Therefore, the found connecting force of the second shift position changing hydraulic clutch 62 is smaller than the actual connecting force of the second shift position changing hydraulic clutch 62. In this regard, the torque detected by the torque sensor 89 shows a more decreasing tendency, as the connecting force of the second shift position changing hydraulic clutch 62 becomes larger. Thus, the fact that the actual connecting force is larger than the found connecting force means that the actual torque generated between the engine 30 and the propeller 41 is larger than the torque that is previously given in the map of FIG. 16.

In this situation, as shown in FIG. 17, the CPU 86a controls the actuator 70 to actuate the second shift position changing hydraulic clutch 62 so that the connecting force thereof decreases to about 70% from about 80%. Afterwards, the CPU 86a controls the actuator 70 to actuate the second shift position changing hydraulic clutch 62 so as to gradually increase the connecting force thereof again.

Figure 18:
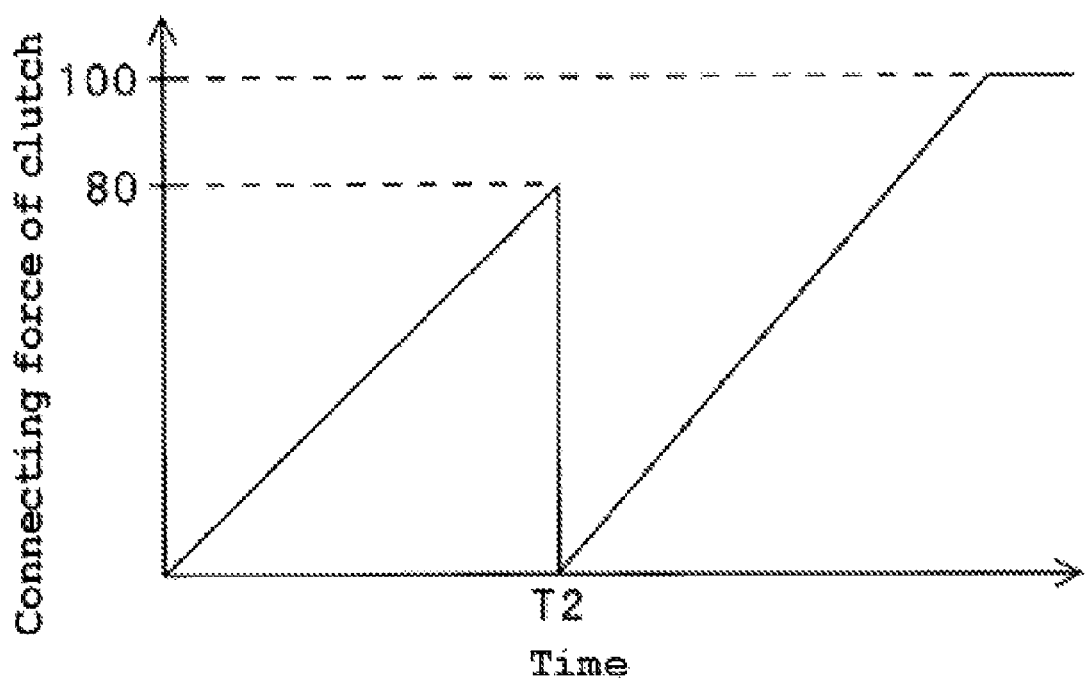
FIG. 18 is a graph showing a change of the connecting force of the clutch at time (T2) under a condition in which the connecting force of the clutch obtained in the graph of FIG. 16 is smaller than the actual connecting force of the clutch.

For example, assume that the connecting force of the second shift position changing hydraulic clutch 62 is plotted at point B in the torque-connecting force map of FIG. 16 under the condition, as shown in FIG. 18, that the actual connecting force is about 80% at time (T2). That is, assuming that the point B is located in a clutch release area in FIG. 16, the CPU 86a, as shown in FIG. 18, controls the actuator 70 to actuate the second shift position changing hydraulic clutch 62 so that the connecting force decreases to 0% from about 80%. In other words, the CPU 86a controls the actuator 70 to actuate the second shift position changing hydraulic clutch 62 to be in the disconnected state. Afterwards, the CPU 86a controls the actuator 70 to actuate the second shift position changing hydraulic clutch 62 to gradually increase the connecting force.

Figure 19:
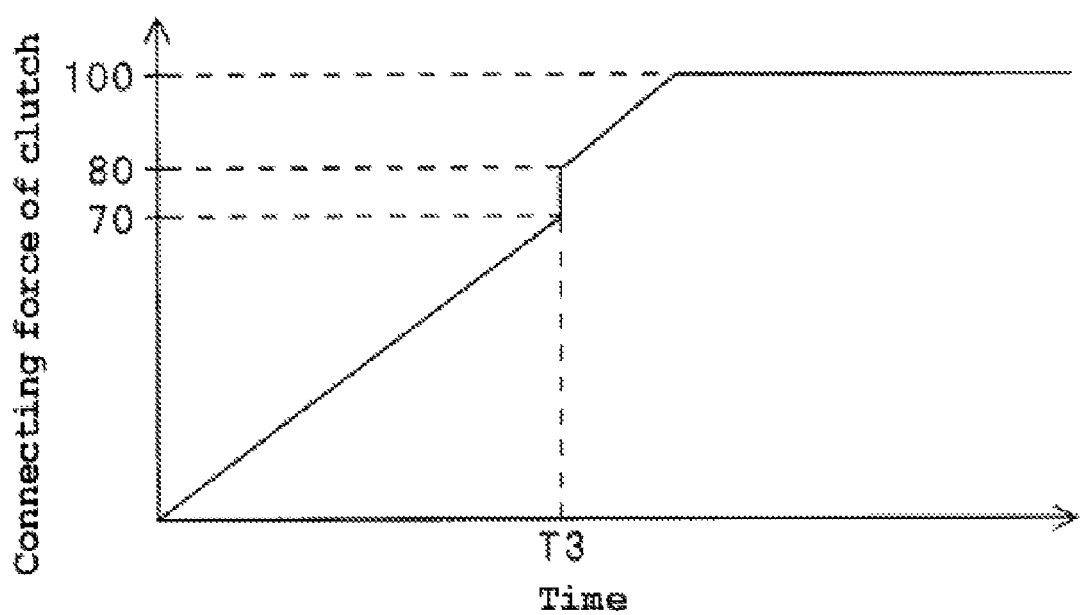
FIG. 19 is a graph showing a change of the connecting force of the clutch at time (T3) under a condition in which the connecting force of the clutch obtained in the graph of FIG. 16 is larger than the actual connecting force of the clutch.

For example, assuming that the connecting force of the second shift position changing hydraulic clutch 62 is plotted at point C in the torque-connecting force map of FIG. 16 under the condition, as shown in FIG. 19, that the actual connecting force is about 70% at time (T3), the connecting force of the second shift position changing hydraulic clutch 62 is found to be about 80%. Therefore, the found connecting force of the second shift position changing hydraulic clutch 62 is larger than the actual connecting force of the second shift position changing hydraulic clutch 62. This means that the actual torque generated between the engine 30 and the propeller 41 is smaller than the torque that is previously given in the map of FIG. 16.

In this situation, as shown in FIG. 19, the CPU 86a controls the actuator 70 to actuate the second shift position changing hydraulic clutch 62 so that the connecting force thereof increases to about 80% from about 70%. As such, if the actual torque is larger than the torque that is previously given in the map, the connecting speed of clutch is controlled to increase.

Additionally, the engine rotational speed and the propeller rotational speed are interrelated to each other. Alternatively, therefore, the connecting periods of the first shift position changing hydraulic clutch 61 can be decided based upon the propeller rotational speed detected by the propeller rotational speed sensor 90 instead of the engine rotational speed.

For example, in order to enhance responsiveness to the operation of the control lever 83 for the shift position change, it could be inappropriate, under some conditions, to provide the shift-in inhibited period. However, there is a certain time lag before the shift position change operation is completed after the control lever 83 has been operated. Because of this, if, for example, the control lever 83 is continuously operated or operated without any pauses, sometimes the actual shift position change cannot follow the operation of the control lever 83. For example, if shift position change operations between the forward command position and the reverse command position are continuously made multiple times at a relatively high speed, a relatively long period of time is necessary for all the shift position change operations to be completed in responding to all the operations of the control lever 83 made multiple times. Accordingly, a relatively long period is required before the shift position changing mechanism 36 is actuated to the shift position corresponding to the shift position finally directed by the control lever 83.

In contrast, there is the shift-in inhibited period provided in this preferred embodiment. Thus, for example, even though the control lever 83 is continuously operated, the shift position change operation to the forward or reverse position is not made in the shift-in inhibited period. After the shift-in inhibited period has elapsed, the shift position change operation is made. More specifically, the shift position changing mechanism 36 is actuated to the shift position corresponding to the shift position directed by the shift lever 83 at a moment when the shift-in inhibited period has just elapsed. Therefore, under the condition that the control lever 83 is continuously operated, a period of time required for the shift position changing mechanism 36 to be actuated to the shift position finally directed by the control lever 83 can be shortened. Thus, the controllability of the boat 1 can be further enhanced.

Specifically, in this preferred embodiment, if the control lever 83 is operated to the forward or reverse command position in the shift-in inhibited period, the shift position changing mechanism 36 is kept at the neutral position during the shift-in inhibited period. Therefore, even though the shift change operations are continuously made multiple times between the forward or reverse command position, the loads applied to the shift position changing mechanism 36 and so forth, vibrations, noises, etc. can be reduced.

In one variation, if the control lever 83 is operated to the forward or reverse command position in the shift-in inhibited period, the shift position changing mechanism 36 can be kept, for example, at the current shift position.

In this preferred embodiment, the connecting force of the first shift position changing hydraulic clutch 61 or the second shift position changing hydraulic clutch 62 is controlled to gradually increase when the shift position changing mechanism 36 is actuated to the forward position or the reverse position from the neutral position after the shift-in inhibited period has elapsed. Thereby, the first or second shift position changing hydraulic clutch 61, 62 is slowly brought into the connected state. Accordingly, the loads applied to the engine 30, the power transmitting mechanism 32, the propulsion unit 33 and so forth can be reduced.

In this preferred embodiment, the CPU 86a decreases the connecting force of the clutch in response to the torque between the engine 30 and the propeller 41 detected by the torque sensor 89 when the shift position changing mechanism 36 is actuated to the forward or reverse position from the neutral position after the shift-in inhibited period has elapsed. More specifically, the connecting force of the clutch is decreased when the actual torque generated between the engine 30 and the propeller 41 becomes larger than the predetermined torque.

If the actual torque generated between the engine 30 and the propeller 41 is larger than the predetermined torque, a relatively large load is applied to the engine 30 and so forth. Under this condition, if the connecting force of the clutch is decreased, the efficiency with which the torque generated in the propeller 41 is transmitted to the engine 30 is decreased. Thus, the load applied to the engine 30 and so forth can be effectively decreased.

Meanwhile, if the actual torque generated between the engine 30 and the propeller 41 is smaller than the predetermined torque, the connecting force of the clutch is raised. Hence, the time period for bringing the clutch to the connected state is shortened. Consequently, the time period for the shift position change can be shortened.

Additionally, the specific controls of the boat 1 described in this preferred embodiment are not necessarily implemented always or under all the operational conditions. The controls can be optionally implemented in accordance with various situations of the boat 1. More specifically, it is only required that the controls be implemented at least under the condition that the traveling speed of the boat 1 is fast and the load applied to the engine 30 is large.

Second Preferred Embodiment

In the first preferred embodiment described above, the shift position changing mechanism 36, as shown in FIG. 8, preferably is actuated to the shift position directed at the moment when the shift-in inhibited period has just elapsed, immediately after the shift-in inhibited period has elapsed, regardless of any transmission ratios of the transmission ratio changing mechanism 35. However, the present invention is not limited to this control. In the present invention, controls implemented after the shift-in inhibited period has elapsed are not restrained insofar as the shift position change to the forward position or the reverse position is inhibited during the shift-in inhibited period.

In the second preferred embodiment, an exemplary manner in which controls after the shift-in inhibited period has elapsed are differently implemented in accordance with the transmission ratio of the transmission ratio changing mechanism 35 provided after the shift-in inhibited period has elapsed will be described below. In the following descriptions, the members having functions common to those of the members described in the first preferred embodiment will be assigned with the same numerals and/or symbols, and further description thereof will be omitted. Also, FIGS. 1-6 are again used to describe the second preferred embodiment.

Figure 20:
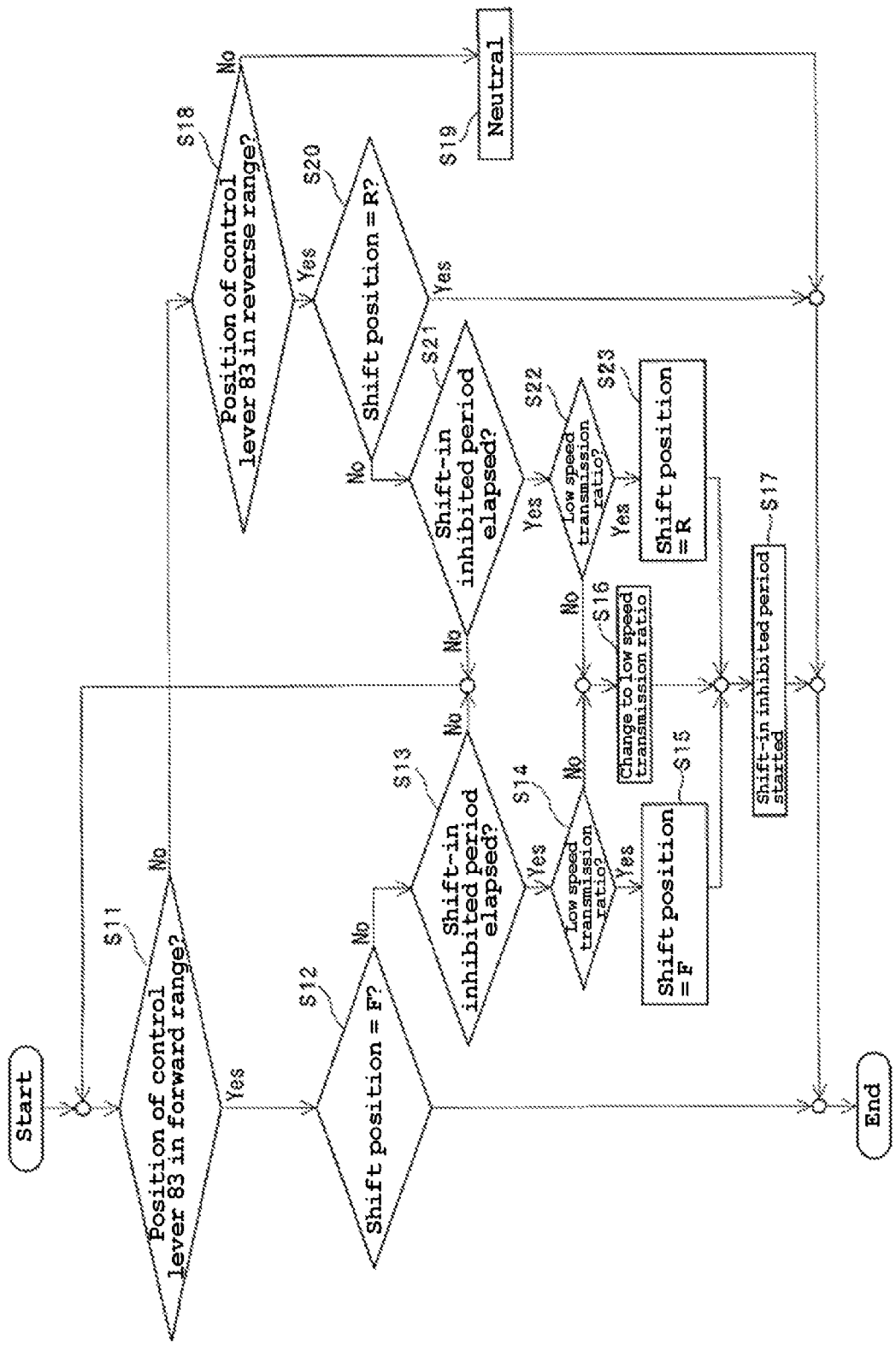
FIG. 20 is a flowchart showing a shift position change control routine executed in a second preferred embodiment of the present invention.

FIG. 20 is a flowchart showing a shift position change control routine provided in accordance with the second preferred embodiment. In this preferred embodiment, first, in step S11, the CPU 86*a* determines based upon an output from the shift position command sensor 85 whether a position of the control lever 83 is placed in the forward range or not. If the CPU 86*a* determines, in step S11, that the position of the control lever 83 is placed in the forward range, the process goes to step S12.

In step S12, the CPU 86*a* determines whether the shift position changing mechanism 36 is in the forward position or not. If, in step S12, the CPU 86*a* determines that the shift position changing mechanism 36 is in the forward position, the control routine ends.

Meanwhile, if the CPU 86*a* determines, in step S12, that the shift position changing mechanism 36 is not in the forward position, the process goes to step S13. In step S13, the CPU 86*a* determines whether the shift-in inhibited period has elapsed or not. If, in step S13, the CPU 86*a* determines that the shift-in inhibited period has not elapsed, the process returns to step S11. That is, if the CPU 86*a* determines that the shift-in inhibited period still continues, the process returns to step S11.

Meanwhile, if the CPU 86*a* determines, in step S13, that the shift-in inhibited period has elapsed, the process goes to step S14.

In step S14, the CPU 86*a* determines whether the transmission ratio of the transmission ratio changing mechanism 35 is the low speed transmission ratio or not. If, in step S14, the transmission ratio of the transmission ratio changing mechanism 35 is the low speed transmission ratio, the process goes to step S15.

In step S15, the CPU 86*a* controls the actuator 70 to actuate the shift position changing mechanism 36 to the forward position.

After executing step S15, the CPU 86*a* executes step S17. In step S17, the CPU 86*a* starts the shift-in inhibited period.

If, in step S14, the CPU 86*a* determines that the transmission ratio of the transmission ratio changing mechanism 35 is not the low speed transmission ratio, the process goes to step S16. That is, if the CPU 86*a* determines, in step S14, that the transmission ratio of the transmission ratio changing mechanism 35 is the high speed transmission ratio, the process goes to step S16.

In step S16, the CPU 86*a* controls the actuator 70 to actuate the transmission ratio changing mechanism 35 so that the transmission ratio is changed to the low speed transmission ratio.

After executing step S16, the CPU 86*a* executes step S17. In step S17, the CPU 86*a* starts the shift-in inhibited period again.

If the CPU 86*a* determines, in step S11, that the position of the control lever 83 is not placed in the forward range, the process goes to step S18. In step S18, the CPU 86*a* determines based upon the output from the shift position command sensor 85 whether the position of the control lever 83 is placed in the reverse range or not.

If the CPU 86*a* determines, in step S18, that the position of the control lever 83 is not placed in the reverse range, the process goes to step S19. In step S19, the CPU 86*a* controls the actuator 70 to actuate the shift position changing mechanism 36 to the neutral position.

Meanwhile, if, in step S18, the CPU 86*a* determines that the position of the control lever 83 is placed in the reverse range, the process goes to step S20.

In step S20, the CPU 86*a* determines based upon the output from the shift position command sensor 85 whether the shift position changing mechanism 36 is in the reverse position or not. If, in step S20, the CPU 86*a* determines that the shift position changing mechanism 36 is in the reverse position, the control routine ends.

Meanwhile, if the CPU 86*a* determines, in step S20, that the shift position changing mechanism 36 is not in the reverse position, the process goes to step S21.

In step S21, the CPU 86*a* determines whether the shift-in inhibited period has elapsed or not. If, in step S21, the CPU 86*a* determines that the shift-in inhibited period has not elapsed, the process returns to step S21. That is, if the CPU 86*a* determines that the shift-in inhibited period still continues, the process returns to step S21.

Meanwhile, if the CPU 86*a* determines, in step S21, that the shift-in inhibited period has elapsed, the process goes to step S22.

In step S22, the CPU 86*a* determines whether the transmission ratio of the transmission ratio changing mechanism 35 is the low speed transmission ratio or not. If, in step S22, the CPU 86*a* determines that the transmission ratio of the transmission ratio changing mechanism 35 is the low speed transmission ratio, the process goes to step S23. In step S23, the CPU 86*a* controls the actuator 70 to actuate the shift position changing mechanism 36 to the reverse position.

After executing step S23, the CPU 86*a* executes step S17. In step S17, the CPU 86*a* starts the shift-in inhibited period.

However, if, in step S22, the CPU 86*a* determines that the transmission ratio of the transmission ratio changing mechanism 35 is not the low speed transmission ratio, the process goes to step S16. In step S16, the CPU 86*a* controls the actuator 70 to actuate the transmission ratio changing mechanism 35 so that the transmission ratio is changed to the low speed transmission ratio.

After executing step S16, the CPU 86*a* executes step S17. In step S17, the CPU 86*a* starts the shift-in inhibited period again.

As thus described, in this preferred embodiment, the shift position change is restrained under the condition that the transmission ratio of the transmission ratio changing mechanism 35 is the high speed transmission ratio. In other words, the shift position is changed under the condition that the transmission ratio of the transmission ratio changing mechanism 35 is the low speed transmission ratio.

Figure 21:
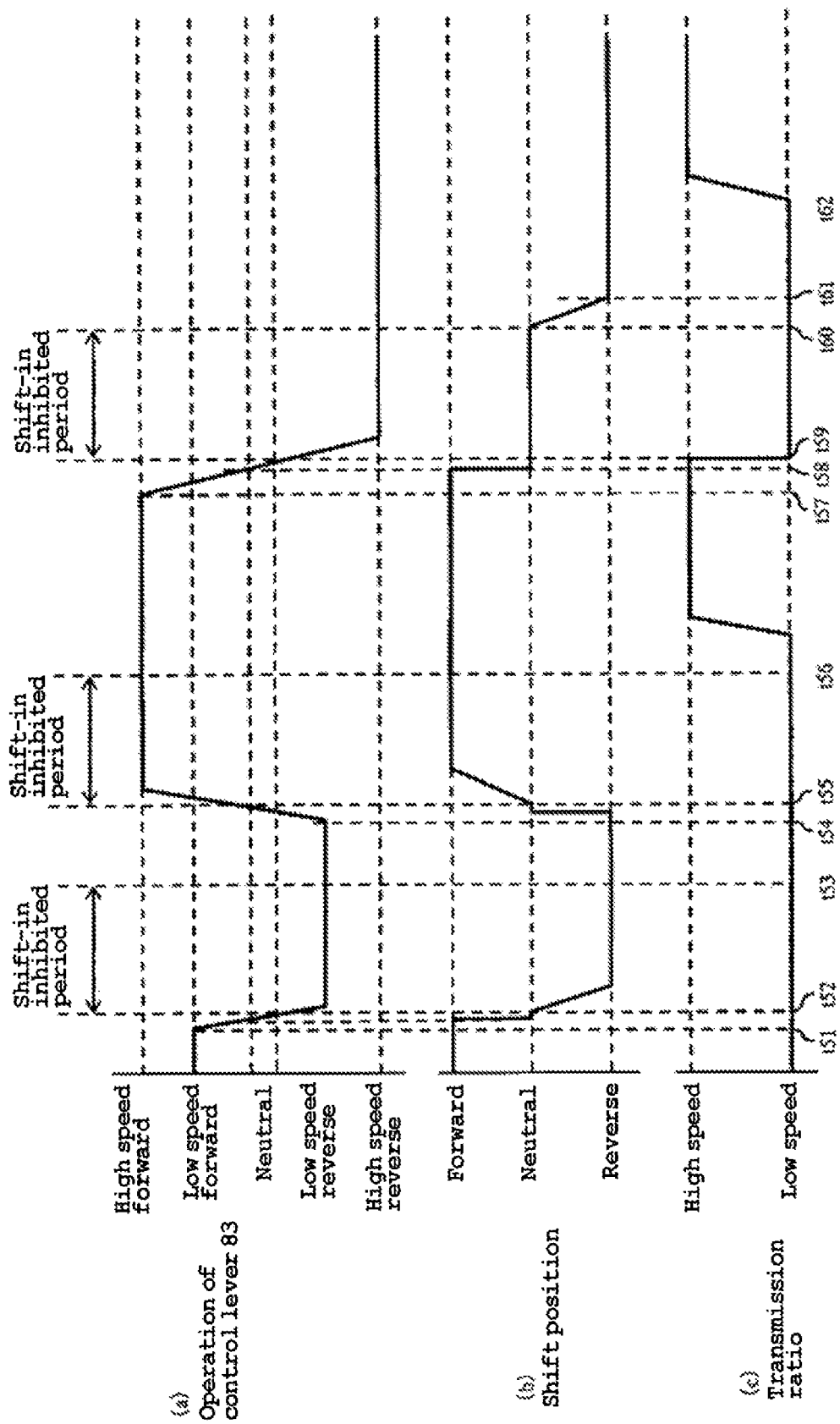
FIG. 21 is a graph showing temporal changes as to command positions of the control lever, shift positions of the shift position changing mechanism, and transmission ratios of a transmission ratio changing mechanism in the second preferred embodiment. More specifically, section (a) shows the temporal change of the command position of the control lever. Section (b) shows the temporal change of the shift position of the shift position changing mechanism. Section (c) shows the temporal change of the transmission ratio of the transmission ratio changing mechanism.

For example, in a control example shown in FIG. 21, the control lever 83 is operated to the low speed reverse command position from the low speed forward command position at time (t51). The shift-in inhibited period, hence, starts at time (t52).

In the control shown in FIG. 21, the control lever 83 is operated to the high speed forward command position from the low speed reverse command position at time (t54) after the shift-in inhibited period (t52)-(t53) has elapsed. Thus, the shift-in inhibited period starts again at time (t55).

Also, the control lever 83 is operated to the high speed reverse command position from the high speed forward command position at time (t57) after the shift-in inhibited period (t55)-(t56) has elapsed. Accordingly, at time (t58), the second shift position changing hydraulic clutch 62 is brought into the disconnected state, and the shift position changing mechanism 36 is actuated to the neutral position. Afterwards, at time (t59) when the position of the control lever 83 is to be placed in the reverse range, the shift-in inhibited period starts again.

In the control shown in FIG. 21, the position of the control lever 83 is still kept in the high speed reverse range after time (t60) when the shift-in inhibited period started at time (t59) has already elapsed. Therefore, the shift position changing mechanism 36 is actuated to the reverse position from the forward position after the shift-in inhibited period (t59)-(t60) has elapsed.

The transmission ratio of the transmission ratio changing mechanism 35 is kept at the low speed transmission ratio during a time period between time (t61) when the shift position change to the reverse position has been completed and time (t62). Afterwards, at time (t62), the transmission ratio of the transmission ratio changing mechanism 35 is changed to the high speed transmission ratio, and the shift position is set at the high speed reverse position.

As described above, in this preferred embodiment, the shift position change is restricted under the condition such that the transmission ratio of the transmission ratio changing mechanism 35 is the high speed transmission ratio. In other words, the shift position is changed under the condition that the transmission ratio of the transmission ratio changing mechanism 35 is the low speed transmission ratio. Hence, the load applied to the engine 30 in the shift position change operation can be small. In addition, the transmission ratio changing mechanism 35 can be kept at the low speed transmission ratio until at least the shift position change is completed. Accordingly, the load applied to the engine 30 in the shift change operation can be smaller.

Control of the rotational speed of the engine used as a prime mover can be performed by feedback control with the detected rotational speed. Alternatively, the rotational speed of the engine can be controlled using feed-forward control by adjusting the throttle opening or the ignition timing to control the engine output. In the feed-forward control, the engine rotational speed can largely fluctuate due to influences such as, for example, a propeller load fluctuation or time delay occurring in the power transmission system. The fluctuation can decrease the load added to the engine 30 in the shift position change operation.

Fifth Variation

Figure 22:
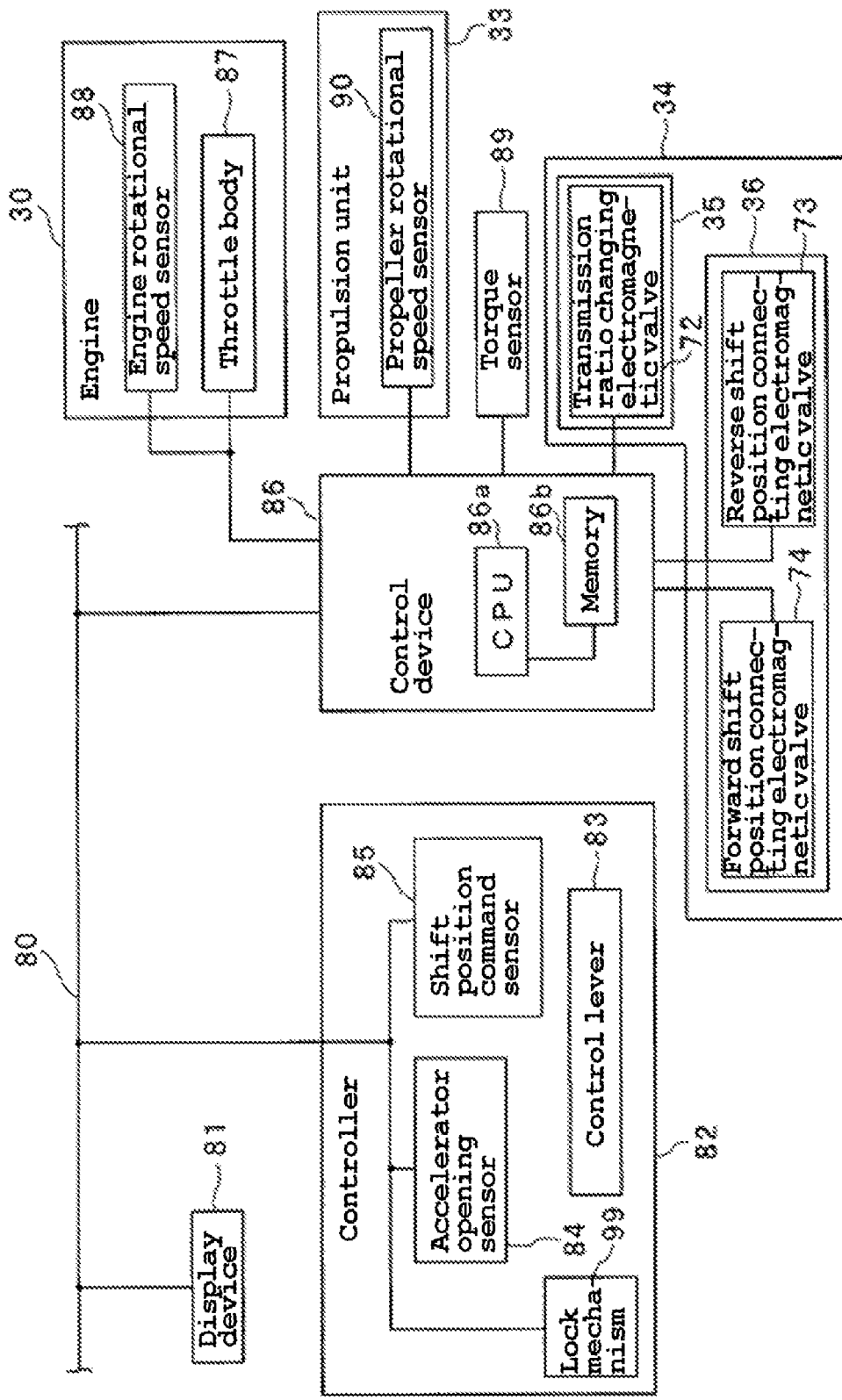
FIG. 22 is a control block diagram for the boat in a fifth variation of a preferred embodiment of the present invention.

FIG. 22 is a control block diagram of a boat configured in accordance with a fifth variation. As shown in FIG. 22, a lock mechanism 99 arranged to disable the operation of the control lever 83 in the shift-in inhibited period can be provided. The lock mechanism 99 is not limited to any particular mechanism insofar as the mechanism works to disable the operation of the control lever 83. For example, the lock mechanism 99 can have a solenoid mechanism 99*a* as shown in FIG. 23.

Figure 23:
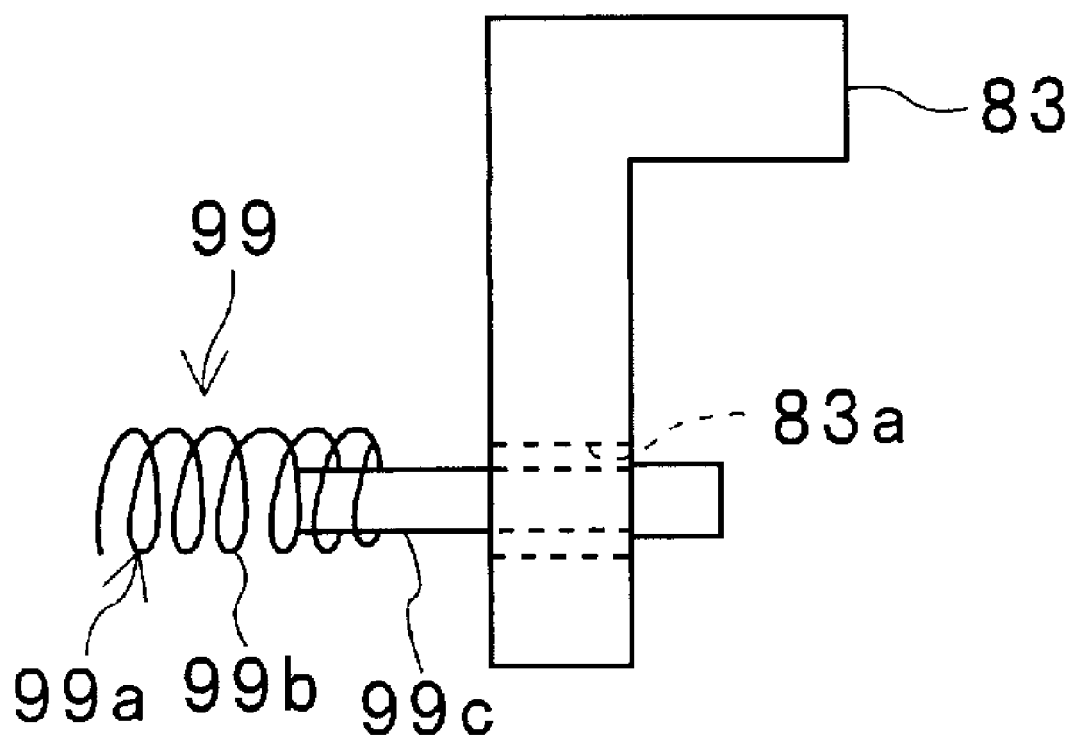
FIG. 23 is a schematic illustration showing a specific structure of a lock mechanism.

More specifically, the solenoid mechanism 99*a* shown in FIG. 23 preferably includes a solenoid coil 99*b* and an engaging member 99*c*. When the control device 86 activates the solenoid mechanism 99*a*, the engaging member 99*c* engages the control lever 83, i.e., enters an aperture 83*a* provided in the control lever 83. Thereby, the operation of the control lever 83 is restrained.

Sixth Variation

In the preferred embodiments described above, the throttle opening of the engine 30 is preferably controlled based upon the accelerator opening inputted by the control lever 83 regardless of the shift-in inhibited period. However, the present invention is not limited to such a construction.

For example, the throttle opening can be prevented from increasing, notwithstanding the accelerator opening, whenever the shift position changing mechanism 36 is in the neutral position in the shift-in prevented period, so that the output of the engine 30 is prevented from increasing. Alternatively, the throttle opening can be controlled in such a manner that the rotational speed of the engine 30 is substantially equal to a rotational speed given under an idling condition of the engine 30, notwithstanding the accelerator opening, whenever the shift position changing mechanism 36 is in the neutral position in the shift-in prevented period. Thereby, the engine rotational speed given when the shift position changing mechanism 36 is in the neutral position in the shift-in prevented period can be prevented from increasing.

In the alternative, the throttle opening can be gradually increased before reaching a throttle opening degree corresponding to the accelerator opening after the shift-in inhibited period has elapsed. Thereby, a sudden change of the engine rotational speed occurring after the shift-in inhibited period has elapsed can be restricted.

Figure 24:
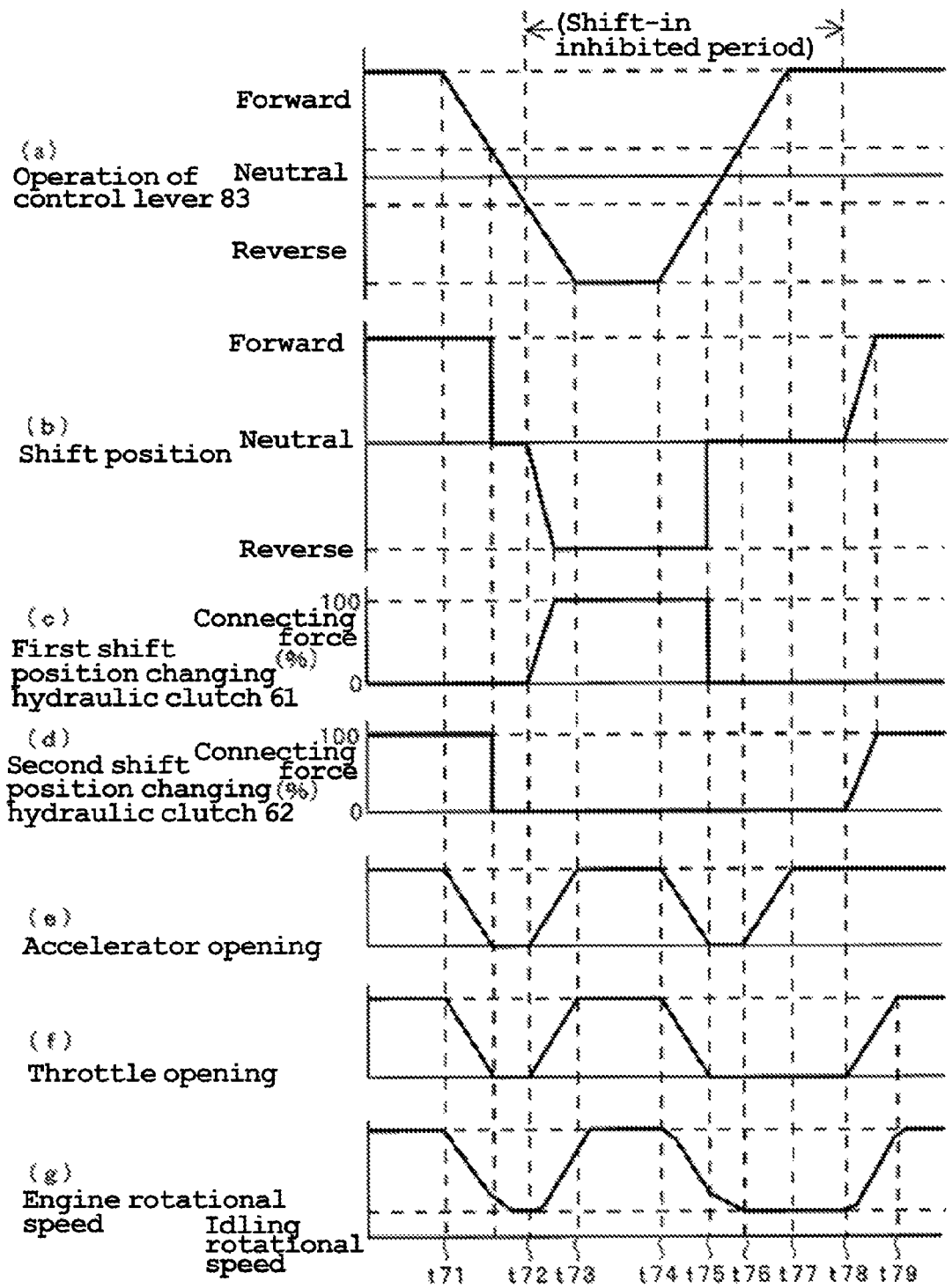
FIG. 24 is a graph showing temporal changes as to command positions of the control lever, shift positions of the shift position changing mechanism, connecting forces of the first and second shift position changing hydraulic clutches, accelerator opening, throttle opening, and engine rotational speeds, in a sixth variation. More specifically, section (a) shows the temporal change of the command position of the control lever. Section (b) shows the temporal change of the shift position of the shift position changing mechanism. Section (c) shows the temporal change of the connecting force of the first shift position changing hydraulic clutch. Section (d) shows the temporal change of the connecting force of the second shift position changing hydraulic clutch. Section (e) shows the temporal change of the accelerator opening. Section (f) shows the temporal change of the throttle opening. Section (g) shows the temporal change of the engine rotational speed.

Referring to a specific control shown in FIG. 24, such variations will be described in more detail below. In the control of FIG. 24, as depicted in section (a), the shift position changing mechanism 36 is actuated to the reverse position from the forward position during time (t71) to time (t73). Accordingly, the period during time (t72) to time (t78) is the shift-in inhibited period.

In the control of FIG. 24, also as depicted in section (a), the shift position changing mechanism 36 is actuated again to the forward position from the reverse position during time (t74) to time (t77). However, the period between time (t74) and time (t77) exists within the shift-in inhibited period (t72)-(t78). Therefore, as depicted in section (b) of FIG. 24, the shift position changing mechanism 36 is kept at the neutral position during time (t75) to time (t78).

In the control example of FIG. 24, as depicted in section (e), by the operation of the control lever made during time (t74) to time (t77), the accelerator opening detected by the accelerator opening sensor 84 shown in FIG. 5 increases during time (t76) to time (t78). However, in this variation, as depicted in section (f) and section (g) of FIG. 24, the throttle opening is kept at a low level during the period between time (t76) and time (t78) existing within the shift-in inhibited period and where the shift position changing mechanism 36 is kept at the neutral position, and the output of the engine 30 is prevented from increasing. Therefore, the engine rotational speed is prevented from increasing during time (t76) to time (t78).

In the control of FIG. 24, the throttle opening and the engine rotational speed are gradually increased to the levels corresponding to the accelerator opening at time (t78) during time (t78) to time (t79) after the shift-in inhibited period has elapsed. Therefore, a sudden increase of the engine rotational speed occurring after the shift-in inhibited period has elapsed can be restricted.

In the control of FIG. 24, the shift position change to the forward position and gradual increase of the engine rotational speed are simultaneously started at time (t78) when the shift-in inhibited period elapses. However, timing of the shift position change and timing of gradual increase of the engine rotational speed are not limited to such a control. For example, gradual increasing of the engine rotational speed can be started within a time period after the shift position change has been started and before the shift position change is completed. Alternatively, gradual increasing of the engine rotational speed can be started at a moment when the shift position change is completed or after the shift position change has been completed.

A time period required for the gradual increasing of the engine rotational speed can be the same as a time period required for the shift position change, can be shorter than the time period required for the shift position change, or can be longer than the time period required for the shift position change.

A manner for the gradual increase of the engine rotational speed is not limited to any particular manner. The engine rotational speed can be gradually increased at a fixed acceleration. The engine rotational speed can be gradually increased in such a manner that acceleration is gradually increased. The engine rotational speed can be gradually increased in such a manner that acceleration is gradually decreased.

Third Preferred Embodiment

In the first preferred embodiment described above, once the shift position changing mechanism 36 is actuated from one of the forward position and the reverse position to the other position, the shift position changing mechanism 36 is inhibited from being actuated to the one of the forward and reverse positions again until the predetermined shift-in inhibited period elapses. That is, the shift-in inhibited period is initiated when the shift position changing mechanism 36 is actuated from one of the forward position and the reverse position to the other position through the neutral position.

However, in the present invention, a condition for initiating the shift-in inhibited period is not limited to the situation such that the shift position changing mechanism 36 is actuated from the one of the forward position and the reverse position to the other position through the neutral position. For example, the shift-in inhibited period can be initiated when the shift position changing mechanism 36 is actuated from the neutral position to the forward or reverse position, including the condition that the shift position changing mechanism 36 is actuated from the one of the forward position and the reverse position to the other position through the neutral position.

Figure 25:
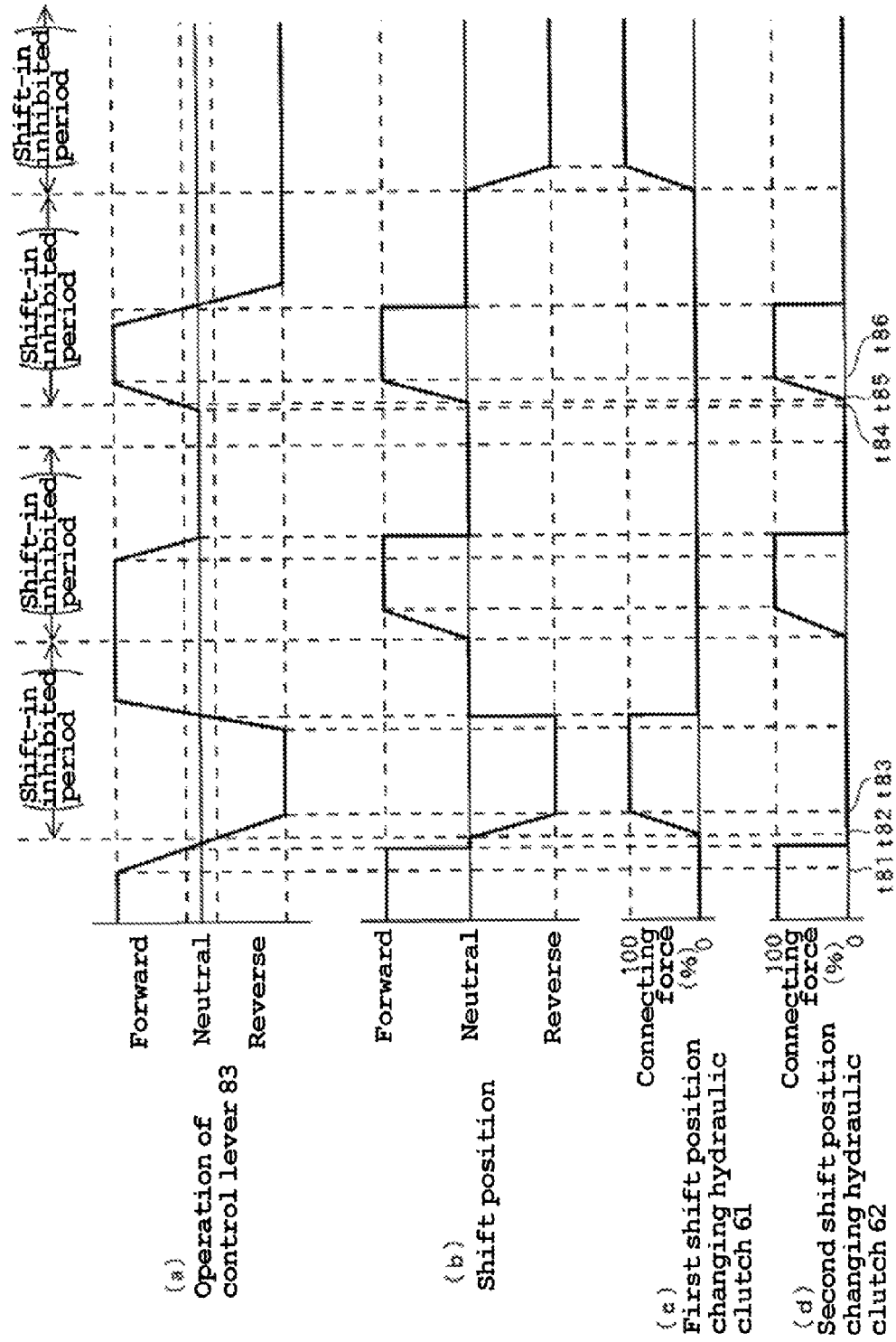
FIG. 25 is a graph showing temporal changes as to command positions of the control lever, shift positions of the shift position changing mechanism and connecting forces of the first and second shift position changing hydraulic clutches, in a third preferred embodiment of the present invention. More specifically, section (a) shows the temporal change of the command position of the control lever. Section (b) shows the temporal change of the shift position of the shift position changing mechanism. Section (c) shows the temporal change of the connecting force of the first shift position changing hydraulic clutch. Section (d) shows the temporal change of the connecting force of the second shift position changing hydraulic clutch.

With reference to FIG. 25, temporal changes to command positions of the control lever 83, shift positions of the shift position changing mechanism 36, and the connecting forces of the first and second shift position changing hydraulic clutches 61, 62 in an exemplary control of the third preferred embodiment will be described below. In the control of FIG. 25, the boat operator operates the control lever 83 to the reverse command position from the forward command position during time (t81) to time (t83). Hence, similarly to the first preferred embodiment, the shift-in inhibited period is initiated at time (t82).

In the control example of FIG. 25, the boat operator operates the control lever 83 to the forward command position from the neutral command position during time (t84) to time (t86). In this preferred embodiment, generally, the shift-in inhibited period is initiated if the shift position changing mechanism 36 is actuated to the forward or reverse position from the neutral position. Thus, in this preferred embodiment, the shift-in inhibited period is also initiated at time (t85) when the shift position changing mechanism 36 is actuated to the forward position from the neutral position.

Other Variations

In the preferred embodiments described above, the memory 86b contained in the ECU 86 mounted to the outboard motor 20 preferably stores both of the map arranged to control the transmission ratio changing mechanism 35 and the map arranged to control the shift position changing mechanism 36. Also, the CPU 86a contained in the ECU 86 mounted to the outboard motor 20 outputs control signals arranged to control the electromagnetic valves 72, 73, 74.

However, the present invention is not limited to such a particular construction. For example, the controller 82 mounted to the boat hull 10 can have a memory functioning as a storage section and a CPU functioning as a calculating section, together with the memory 86b and the CPU 86a, or instead of the memory 86b and the CPU 86a. In these alternatives, the memory provided to the controller 82 can store the map arranged to control the transmission ratio changing mechanism 35 and the map arranged to control the shift position changing mechanism 36. Also, the CPU provided to the controller 82 can output the control signals arranged to control the electromagnetic valves 72, 73, 74.

In the preferred embodiments described above, the ECU 86 preferably controls all of the engine 30 and the electromagnetic valves 72, 73, 74. However, the present invention is not limited to such a particular control. For example, an ECU arranged to control the engine and an ECU for controlling the electromagnetic valves can be separately provided.

In the preferred embodiments described above, the controller 82 is preferably a so-called "electronically controlled controller." The term "electronically controlled controller" means a controller that converts an operational amount of the control lever 83 to an electric signal and outputs the electrical signal to the LAN 80, for example.

However, in the present invention, the controller 82 can also be a controller other than the electronically controlled controller. The controller 82 can be, for example, a so-called "mechanically controlled controller." The term "mechanically controlled controller" means a controller that has a control lever and a mechanical wire connected to the control lever and transmits an operational amount and an operational direction of the control lever to the outboard motor in the physical quantity of an operational amount and an operational direction of the wire, for example.

In the preferred embodiments described above, the shift mechanism 34 preferably includes the transmission ratio changing mechanism 35. However, the shift mechanism 34 does not necessarily include the transmission ratio changing mechanism 35. For example, the shift mechanism 34 can have only the shift position changing mechanism 36.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A boat propulsion system comprising:
   a prime mover arranged to generate a rotational force;
   a marine propulsion unit having a propeller arranged to be driven by the rotational force of the prime mover to generate a thrust force;
   a shift position changing mechanism located between the prime mover and the propulsion unit, and arranged to selectively change a shift position among a first shift position, a second shift position in which a rotational direction of the rotational force of the prime mover is reversed and the reversed rotational force is transmitted to the propulsion unit, and a neutral position;
   a shift position changing mechanism actuator arranged to actuate the shift position changing mechanism; and
   a control unit arranged to control the shift position changing mechanism actuator; wherein
   when the shift position is changed to one of the first shift position and the second shift position from the neutral position, the control unit is arranged to inhibit a change of the shift position to the other one of the first shift position and the second shift position until a predetermined time period elapses;
   the boat propulsion system further comprising:
   a control lever arranged to change the shift positions; and
   a shift position command detecting section arranged to detect a position of the control lever and to output a signal indicative that the shift position changing mechanism is to be at a shift position corresponding to the position of the control lever to the control unit so that the control unit controls the shift position changing mechanism actuator to actuate the shift position changing mechanism to the shift position corresponding to the position of the control lever; wherein
   even if a signal indicative that the shift position changing mechanism is to be at the other one of the first shift position and the second shift position is outputted from the shift position command detecting section after the shift position change to the one of the first shift position and the second shift position from the neutral position and before the predetermined time period elapses, the control unit does not allow the shift position changing mechanism to change the shift position to the other one of the first shift position and the second shift position.

2. The boat propulsion system according to claim 1, wherein the shift position changing mechanism is arranged to selectively change the shift position among the first shift position, the second shift position, and the neutral position in which the rotational force of the prime mover is not transmitted to the propulsion unit; and when a signal indicative that the shift position changing mechanism is to be in the other one of the first shift position and the second shift position is outputted from the shift position command detecting section after the shift position change to the one of the first shift position and the second shift position from the neutral position and before the predetermined time period elapses, the control unit controls the shift position changing mechanism actuator to actuate the shift position changing mechanism to the neutral position and to keep the shift position changing mechanism at the neutral position until the predetermined time period elapses.

3. The boat propulsion system according to claim 2, wherein when the shift position changing mechanism is in the neutral position after the shift position change to the one of the first shift position and the second shift position from the neutral position and before the predetermined time period elapses, the control unit does not allow the prime mover to increase an output thereof.

4. The boat propulsion system according to claim 3, wherein the control unit is arranged to allow the prime mover to gradually increase a rotational speed thereof when increasing the rotational speed after the predetermined time period has elapsed.

5. The boat propulsion system according to claim 2, wherein the control unit is arranged to allow the shift position changing mechanism to select a shift position corresponding to the signal outputted from the shift position command detecting section after the predetermined time period has elapsed when the signal indicative that the shift position changing mechanism is to be at the other one of the first shift position and the second shift position is outputted from the shift position command detecting section after the shift position change to the one of the first shift position and the second shift position from the neutral position and before the predetermined time period elapses.

6. The boat propulsion system according to claim 5, wherein the shift position changing mechanism includes a clutch arranged to selectively connect or disconnect the prime mover and the propulsion unit to or from each other, and set the shift position changing mechanism to be in the neutral position; and
   the control unit is arranged to control a connecting force of the clutch to gradually increase until the clutch is connected when the signal indicative that the shift position changing mechanism is to be at the other one of the first shift position and the second shift position is outputted from the shift position command detecting section after the shift position change to the one of the first shift position and the second shift position from the neutral position and before the predetermined time period elapses and when allowing the shift position changing mechanism to select the other one of the first shift position and the second shift position.

7. The boat propulsion system according to claim 5, further comprising:
   a transmission ratio changing mechanism arranged between the prime mover and the propulsion unit and arranged to selectively change a transmission ratio provided between the prime mover and the propulsion unit between a low speed transmission ratio and a high speed transmission ratio; and
   a transmission ratio changing mechanism actuator arranged to actuate the transmission ratio changing mechanism; wherein
   the control unit is arranged to control the transmission ratio changing mechanism actuator to change the transmission ratio of the transmission ratio changing mechanism to the low speed transmission ratio after the predetermined time period has elapsed when the signal indicative that the shift position changing mechanism is to be in the other one of the first shift position and the second shift position is outputted from the shift position command detecting section after the shift position change to the one of the first shift position and the second shift position from the neutral position and before the predetermined time period elapses.

8. The boat propulsion system according to claim 7, wherein the control unit is arranged to control the transmission ratio changing mechanism actuator to keep the transmission ratio of the transmission ratio changing mechanism at the low speed transmission ratio until the shift position change that starts after the predetermined time period has elapsed is completed when the signal indicative that the shift position changing mechanism is to be in the other one of the first shift position and the second shift position is outputted from the shift position command detecting section after the shift position change to the one of the first shift position and the second shift position from the neutral position and before the predetermined time period elapses.

9. The boat propulsion system according to claim 1, further comprising:
 a lock mechanism arranged to lock the control lever; wherein
 the control unit controls the lock mechanism to lock the control lever to disable the control lever after the shift position change to the one of the first shift position and the second shift position from the neutral position and before the predetermined time period elapses.

* * * * *